United States Patent
Zhao et al.

(10) Patent No.: US 11,023,881 B2
(45) Date of Patent: Jun. 1, 2021

(54) NEAR FIELD COMMUNICATION NFC-BASED TRANSACTION METHOD AND DEVICE

(71) Applicant: HUAWEI TECHNOLOGIES CO., LTD., Shenzhen (CN)

(72) Inventors: Xiaona Zhao, Beijing (CN); Jingqing Mei, Beijing (CN); Xinmiao Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 16/097,264

(22) PCT Filed: Apr. 29, 2016

(86) PCT No.: PCT/CN2016/080753
§ 371 (c)(1),
(2) Date: Oct. 28, 2018

(87) PCT Pub. No.: WO2017/185349
PCT Pub. Date: Nov. 2, 2017

(65) Prior Publication Data
US 2019/0114618 A1    Apr. 18, 2019

(51) Int. Cl.
*G06Q 40/00* (2012.01)
*G06Q 20/08* (2012.01)
(Continued)

(52) U.S. Cl.
CPC ....... *G06Q 20/3278* (2013.01); *G06Q 20/085* (2013.01); *G06Q 20/227* (2013.01); *G06Q 40/00* (2013.01)

(58) Field of Classification Search
CPC .... G06Q 20/3278; G06Q 20/20; G06Q 20/32; G06Q 40/02
(Continued)

(56) References Cited

U.S. PATENT DOCUMENTS 8,005,426 B2 *  8/2011  Huomo ................. G06Q 20/20
                                              455/41.2
8,874,032 B2 * 10/2014  Yang ........................ H04B 5/00
                                              455/41.1
(Continued)

FOREIGN PATENT DOCUMENTS

CN    101680925 A    3/2010
CN    101840548 A    9/2010
(Continued)

OTHER PUBLICATIONS

Anna Takao,"Complete Guide to Android NFC Programming", 1st Ed., Shoeisha Co., Ltd., Mikio Sasaki, Sep. 12, 2013, 1st Ed total 25 pages with 4 pages English Translation.

*Primary Examiner* — Kelly S. Campen
(74) *Attorney, Agent, or Firm* — Kilpatrick Townsend & Stockton LLP

(57) ABSTRACT

This application relates to electronic hardware, and in particular, to a handheld terminal that performs a transaction based on NFC. A first terminal and a second terminal each support multiple transaction manners, negotiate a to-be-used transaction manner by using an NFC connection, and automatically invoke a payment client to initiate a transaction request to a transaction server. The first terminal and the second terminal further sort and screen the multiple transaction manners before negotiation.

21 Claims, 16 Drawing Sheets

(51) Int. Cl.
*G06Q 20/32* (2012.01)
*G06Q 20/22* (2012.01)

(58) Field of Classification Search
USPC ............ 705/71, 17, 21, 26.1, 35, 39, 64, 50; 455/41.1, 41.2, 70, 71
See application file for complete search history.

(56) References Cited

U.S. PATENT DOCUMENTS

| | | | |
|---|---|---|---|
| 10,390,370 B2* | 8/2019 | Yu | H04W 4/70 |
| 10,445,722 B2* | 10/2019 | Ce | G06Q 40/02 |
| 10,460,314 B2* | 10/2019 | Hird | H04L 63/062 |
| 2007/0278290 A1 | 12/2007 | Messerges et al. | |
| 2008/0078831 A1 | 4/2008 | Johnson et al. | |
| 2009/0098825 A1* | 4/2009 | Huomo | G06Q 20/20 455/41.1 |
| 2009/0192913 A1 | 7/2009 | Saito et al. | |
| 2013/0041776 A1* | 2/2013 | Schunemann | G06Q 30/02 705/26.41 |
| 2013/0054390 A1* | 2/2013 | Kerchner | G07G 1/0081 705/17 |
| 2013/0215467 A1* | 8/2013 | Fein | G06F 3/1204 358/1.15 |
| 2013/0282589 A1* | 10/2013 | Shoup | G06F 21/34 705/67 |
| 2013/0346319 A1* | 12/2013 | Tan | G06Q 20/3829 705/71 |
| 2014/0012723 A1* | 1/2014 | Lobmaier | G06Q 20/223 705/35 |
| 2014/0025567 A1* | 1/2014 | Rigby | G06Q 20/26 705/39 |
| 2014/0180774 A1* | 6/2014 | Rangarajan | G06Q 30/0284 705/13 |
| 2014/0180856 A1* | 6/2014 | Lau | G06Q 20/20 705/21 |
| 2014/0279509 A1* | 9/2014 | Khilnani | G06Q 20/227 705/44 |
| 2014/0358783 A1 | 12/2014 | Mansur | |
| 2015/0019442 A1* | 1/2015 | Hird | H04L 63/062 705/71 |
| 2015/0134540 A1* | 5/2015 | Law | G06Q 20/351 705/72 |
| 2015/0327071 A1* | 11/2015 | Sharma | H04W 12/12 726/6 |
| 2016/0104155 A1* | 4/2016 | McGaugh | G06Q 20/325 705/65 |
| 2017/0039599 A1* | 2/2017 | Tunnell | H04L 67/20 |
| 2017/0061404 A1* | 3/2017 | Tunnell | G06Q 20/102 |
| 2017/0068955 A1* | 3/2017 | Agarwal | G06Q 20/3829 |
| 2017/0330184 A1* | 11/2017 | Sabt | G06Q 20/3278 |
| 2019/0044597 A1* | 2/2019 | Tamrakar | H04L 5/0037 |

FOREIGN PATENT DOCUMENTS

| | | |
|---|---|---|
| CN | 102314649 A | 1/2012 |
| CN | 103440573 A | 12/2013 |
| CN | 105046487 A | 11/2015 |
| EP | 2940640 A1 | 11/2015 |
| JP | 2009181224 A | 8/2009 |
| JP | 2010505192 A | 2/2010 |
| WO | 2007146470 A2 | 12/2007 |
| WO | 2015188728 A1 | 12/2015 |

* cited by examiner

NEAR FIELD COMMUNICATION NFC-BASED TRANSACTION METHOD AND DEVICE

CROSS-REFERENCE TO RELATED APPLICATIONS

This application is a national stage of International Application No. PCT/CN2016/080753, filed on Apr. 29, 2016, which is hereby in cooperated by reference in its entirety.

TECHNICAL FIELD

Embodiments of the present invention relate to electronic hardware, and in particular, to a handheld terminal that performs a transaction based on NFC.

BACKGROUND

Currently, in an application that can be used for transfer transaction, there are multiple payment clients dedicated to financial transactions, for example, applications developed by third-party organizations or banking institutions, such as Alipay, Baidu Wallet, Jingdong Wallet, PayPal, Google Wallet, and PPmoney.

In the prior art, when a mobile terminal user uses a payment client to perform face-to-face transfer, a charge receiver and a charge payer first negotiate a to-be-used payment client, then perform transfer in any one of the following manners: A first manner is that both the charge receiver and the charge payer start a same payment client, and then perform transfer in a code scanning manner or a sound wave manner; and a second manner is that one party queries a charge receiving account or a payment account of the other party, and then manually enters the charge receiving account or the payment account into a payment client for payment or charge receiving.

Because more than one payment client is installed on and used by the mobile terminal user, each time transfer transaction needs to be performed, the charge receiver and the charge payer orally negotiate the to-be-used payment client, and then separately start a payment client on a mobile phone manually. This operation is not simplified. In addition, a problem exists: After selecting a payment client for transaction, a user needs to select another payment client when a corresponding account balance is insufficient.

SUMMARY

In view of this, embodiments of the present invention provide a near field communication NFC-based transaction method and an apparatus, so that two terminals having multiple transaction manners can quickly obtain a to-be-used transaction manner by means of matching, and a transaction success rate increases. Therefore, an NFC-based transaction process is simple and convenient.

According to one aspect, an embodiment of the present invention provides a near field communication NFC-based transaction method, including:

screening, by a first terminal, an original first transaction manner list of the first terminal, and removing a currently unavailable transaction manner, to obtain a first transaction manner list, where the original first transaction manner list includes at least one first terminal transaction manner supported by the first terminal; and
sending, by the first terminal, the first transaction manner list and a first account list to a second terminal by using an NFC connection, so as to perform transaction manner negotiation with the second terminal, where the first account list includes at least one first terminal account corresponding to a first terminal transaction manner in the first transaction manner list.

In this implementation, after screening the first terminal transaction manners supported by the first terminal, the first terminal provides a first terminal transaction manner obtained by means of screening to the second terminal for transaction, thereby increasing the transaction success rate, and reducing or avoiding a case in which transaction is performed again in another transaction manner after transaction failure occurs.

In a possible implementation, before the first terminal screens the original first transaction manner list, the first terminal generates the original first transaction manner list according to a payment client installed on the first terminal. In this implementation, after the original first transaction manner list is generated, the payment client may be directly deleted, and does not occupy memory space of the first terminal, especially when the first terminal serves as a charge receiver.

Further, the first terminal transaction manner is identification information generated by the first terminal according to the payment client installed on the first terminal. The identification information may be common information that can be identified by both the first terminal and the second terminal, and may be used to identify a corresponding payment client, to complete a transaction. In this implementation, a sent data volume can be reduced, and interaction efficiency can be improved.

In a possible implementation, the first terminal generates the first account list according to the first transaction manner list. All transaction manners in the first transaction manner list can be used by the first terminal. In this case, the first account list is generated, so that a corresponding first terminal account is available in each first terminal transaction manner. Transaction can be successfully completed after the first transaction manner list and the first account list are sent to the second terminal.

In a possible implementation, a screening condition may be one or more of the following conditions: whether an account balance corresponding to the first terminal transaction manner is sufficient, whether the first terminal transaction manner is bound to another authorized payment account, whether a payment client corresponding to the first terminal transaction manner is logged in or stores an account and a password that are used for login, or whether a payment client corresponding to the account and the password that are used for login is uninstalled.

In a possible implementation, the first terminal encrypts the first account list, and generates an alias of user information corresponding to a payment client, so as to protect personal information of a user and improve security.

In a possible implementation, the first terminal sorts the first transaction manner list, so as to determine a preferentially used transaction manner during transaction manner negotiation. That is, when multiple transaction manners are available, a to-be-used transaction manner may be determined according to sorting.

In a possible implementation, sorting may be performed according to one or more of the following conditions: a priority sequence automatically set or manually set by a user, a use probability, user preference, an account balance, or a result of matching between a current transaction amount and amount data generated when each payment client is previously used each time.

According to another aspect, an embodiment of the present invention provides a near field communication NFC-based transaction method, including:

screening, by a second terminal, an original second transaction manner list of the second terminal, and removing a currently unavailable transaction manner, to obtain a second transaction manner list, where the original second transaction manner list includes at least one second terminal transaction manner supported by the second terminal, the second terminal further includes a second account list, and the second account list includes at least one second terminal account corresponding to a second terminal transaction manner in the second transaction manner list;

receiving, by the second terminal, a first transaction manner list and a corresponding first account list from a first terminal by using an NFC connection, where the first transaction manner list includes at least one first terminal transaction manner supported by the first terminal, and the first account list includes at least one first terminal account corresponding to the first terminal transaction manner;

performing, by the second terminal, matching between the first transaction manner list and the second transaction manner list, to obtain at least one matched transaction manner supported by both the first terminal and the second terminal; and sending, by the second terminal, a transaction request to a server corresponding to a matched transaction manner, where the transaction request includes a first terminal account and a second terminal account that are corresponding to the matched transaction manner, and a transaction amount.

In this implementation, the second terminal needs to interact with the first terminal only once to obtain a transaction manner supported by the first terminal and a corresponding account that are required for completing a transaction. Then, the second terminal obtains an available transaction manner by means of screening before performing transaction manner matching. This can improve the transaction success rate, and delivers good user experience.

In a possible implementation, the first terminal transaction manner included in the first transaction manner list is a transaction manner that is obtained by the first terminal by means of screening and that can be currently used by the first terminal.

In a possible implementation, alternatively, a step of screening, by a second terminal, an original second transaction manner list may be performed after the first transaction manner list and the corresponding first account list are received.

In a possible implementation, the method further includes:

when the second terminal obtains multiple matched transaction manners by means of matching, selecting, by the second terminal, a matched transaction manner from the multiple matched transaction manners to determine a corresponding first terminal account, a corresponding second terminal account, and a server corresponding to the matched transaction manner.

In a possible implementation, after obtaining a matched transaction manner, the second terminal automatically starts a payment client corresponding to the matched transaction manner, so as to receive a transaction amount that is entered by a user and/or a transaction type.

In a possible implementation, the method further includes:

before transaction manner matching is performed, receiving, by the second terminal, a transaction amount, where the transaction amount may be manually entered by a user, or may be automatically obtained, or may be received from the first terminal.

It should be noted that steps or features executed by the foregoing first terminal may also be applied to the second terminal without causing a technical solution conflict, and details are not described herein.

According to still another aspect, an embodiment of the present invention provides a near field communication NFC-based transaction method. A similarity with the foregoing method is not described herein, and a difference lies in that a second terminal may first receive a first transaction manner list from a first terminal, perform matching between the first transaction manner list and a second transaction manner list, and then request, from the first terminal after obtaining a matched transaction manner, a first terminal account corresponding to the matched transaction manner.

According to still another aspect, an embodiment of the present invention provides a near field communication NFC-based transaction method. A similarity with the foregoing method is not described herein, and a difference lies in that a second terminal may first receive, from a first terminal, a first terminal transaction manner and a first terminal account corresponding to the first terminal transaction manner, perform matching between the received first terminal transaction manner and a second transaction manner list, then request, from the first terminal without obtaining a matched transaction manner, a first transaction manner list including another first terminal transaction manner, to perform matching between the first transaction manner list and the second transaction manner list, and then request, from the first terminal after obtaining the matched transaction manner, a first terminal account corresponding to the matched transaction manner.

According to another aspect, an embodiment of the present invention provides a device, and the device includes a function that can be used to implement the foregoing transaction manner screening and transaction manner negotiation by using an NFC connection, to complete a transaction. The function may be implemented by using hardware, or may be implemented by executing corresponding software by hardware. The hardware or software includes one or more modules corresponding to the foregoing function. The module may be hardware and/or software.

In a possible implementation, the device includes an NFC unit, a memory, a processor, and a communications unit. The NFC unit performs communication between devices, to complete transaction manner negotiation. The memory stores a transaction manner list and a corresponding account list. The processor reads and screens a transaction manner list from the memory, matches transaction manners of different devices, and initiates a transaction request to a server corresponding to a transaction manner by using the communications unit.

According to still another aspect, an embodiment of the present invention provides a storage medium, configured to store a computer software instruction that is used to implement the foregoing implementation.

By using the foregoing solutions, in the embodiments of the present invention, transaction manner negotiation between the two terminals can be quickly and efficiently implemented by using an NFC connection, and transaction can be completed.

DESCRIPTION OF EMBODIMENTS

Figure 1:
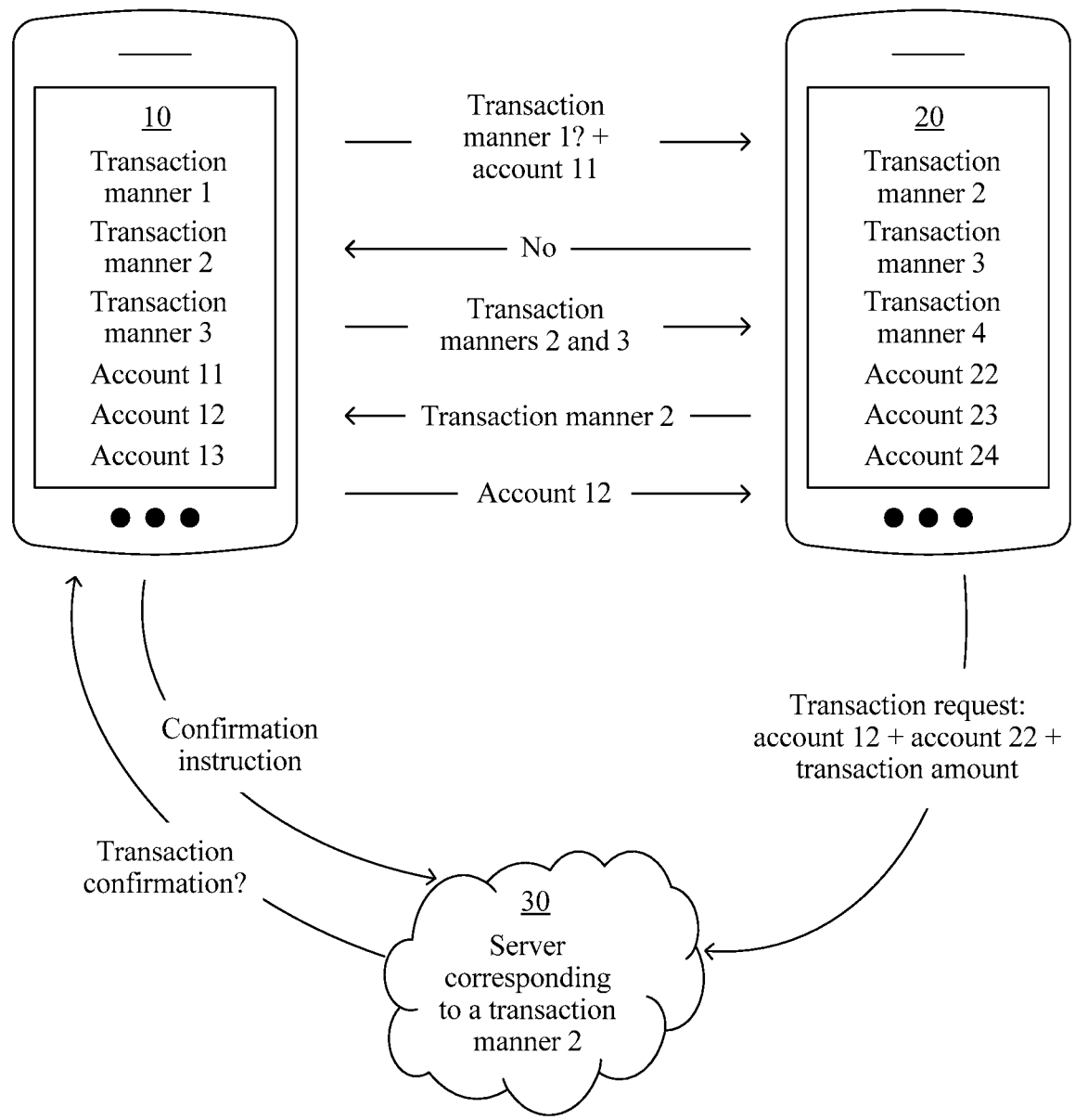
FIG. 1 is a schematic diagram of a transaction method according to a possible implementation of the present invention.

FIG. 1 is a schematic diagram of a transaction method according to a possible implementation of the present invention. As shown in FIG. 1, a first terminal 10 and a second terminal 20 first perform transaction manner negotiation, and after determining a transaction manner, one of the first terminal 10 and the second terminal 20 initiates a transaction request to a server 30 corresponding to the to-be-used transaction manner.

In a possible implementation, the first terminal 10 and the second terminal 20 perform negotiation by using a near field communication NFC connection. That is, the negotiation includes the following information exchange or transmission. It should be noted that the first terminal 10 and the second terminal 20 may also perform communication in another wired or wireless manner, such as a QR code manner, a sound wave manner, an infrared manner, a Bluetooth manner, or a Wi-Fi manner. In addition, in the wireless communication manner, any communications standard or protocol may be used, including but not limited to: GSM (Global System of Mobile communication, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, and SMS (Short Messaging Service, short message service).

Near field communication (NFC, Near Field Communication) is a wireless connection technology that is used to implement short-distance communication between electronic devices by means of magnetic field induction. A working frequency of the near field communication is 13.56 MHz, an effective communication range of the near field communication is 0 cm to 20 cm, and a typical value is 4 cm. Two NFC terminals (that is, terminals with an NFC function, for example, NFC mobile phones) may implement quick and secure data exchange by means of touching or approaching.

An NFC terminal can work in three modes (in terms of a role played in NFC communication): a card emulation (CE, Card Emulation) mode, a reader/writer (R/W, Reader/Writer) mode, and a peer-to-peer (P2P, Peer-to-Peer) mode.

CE mode: A device with an NFC function is emulated into a contactless card or an NFC tag (Tag). The CE mode is applied to a mobile payment scenario such as a bank card, a transportation card, a membership card, a coupon, or an identity card, and an identity authentication scenario. In this mode, a mobile device can still be used as a card even when running out of battery or even after being switched off.

R/W mode: A mobile phone with an NFC function is used as a card reader, and can read data from an NFC tag or card. The R/W mode is applied to a mobile payment scenario such as a bank card POS machine or a bus POS machine, an identity authentication scenario, and a reader/writer tag scenario.

P2P mode: Two terminals with an NFC function can establish a peer-to-peer communication link between them, and then perform data exchange. The P2P mode is applied to a scenario such as contact card sharing, web page sharing, or NFC pairing Bluetooth/Wi-Fi.

In a possible implementation, the first terminal 10 supports at least one transaction manner. For example, the first terminal 10 may include the following information: a transaction manner 1, an account 11 corresponding to the first terminal 10, a transaction manner 2, an account 12 corresponding to the first terminal 10, a transaction manner 3, and an account 13 corresponding to the first terminal 10. The second terminal 20 supports at least one transaction manner. For example, the second terminal 20 may include the following information: the transaction manner 2, an account 22 corresponding to the second terminal 20, the transaction manner 3, an account 23 corresponding to the second terminal 20, a transaction manner 4, and an account 24 corresponding to the second terminal 20. It may be easily understood that the first terminal 10 and/or the second terminal 20 may include different quantities of transaction manners.

In a possible implementation, transaction manners supported by the first terminal 10 or the second terminal 20 are payment clients installed on the first terminal 10 or the second terminal 20, for example, applications developed by third-party organizations or banking institutions, such as Alipay, Tenpay, Baidu Wallet, Jingdong Wallet, PayPal, Google Wallet, PPmoney, and Apple Pay. The payment clients may further include card-type applications, such as a deposit card, a credit card, and a gift card.

In a possible implementation, an account may be user information corresponding to a transaction manner, such as a login account name of a payment client, information used to identify a login account of the payment client (for example, a server of the payment client is an identifier allocated by the payment client), a mobile phone number, an email address, a bank card number, or a trusted hardware identification number (such as information used to identify terminal hardware); or may be an encrypted alias, such as a digital token used one or more times; or may be transaction information (such as information included in a QR code or a bar code used for charge receiving or payment, or information included in a sound wave used for charge receiving or payment) generated locally or on a server after a user selects a transfer function on a payment client (for example, in a QR code manner, a bar code manner, or a sound wave manner). Encryption may be performed locally or on the server, provided that a server corresponding to the transaction manner can identify information corresponding to the account.

In a possible implementation, bank card information may be pre-stored by a payee terminal or bound to a payment application; or may be obtained by a payee terminal from another application (such as a card emulation application stored in a terminal SE) or an external physical card (such as a physical bank card that may be read by using an NFC connection or obtained by means of photographing); or may be manually entered by a user.

In a possible implementation, a transaction manner used by the first terminal 10 and the second terminal 20 for transaction may be executed by two different payment clients. For example, the first terminal 10 has a payment client of a bank A, and the second terminal 20 has a payment client of a bank B. The two clients support inter-bank transfer by using a channel such as Unionpay, Visa, or Mastercard.

In a possible implementation, the first terminal 10 and/or the second terminal 20 pre-store/pre-stores their respective lists of transaction manners supported and/or their respective lists of accounts corresponding to transaction manners, or generate/generates, when performing transaction manner negotiation, their respective lists of transaction manners supported and/or their respective lists of accounts corresponding to transaction manners.

In a possible implementation, when performing interaction and identifying that transaction manner negotiation is required (for example, the first terminal 10 receives, by using an NFC connection, information that is sent by the second terminal 20 and that is used to request the first terminal to perform current transaction manner negotiation, and the information is, for example, a command that is sent in the reader/writer mode and that is used for reading a tag, or a request that is sent in the peer-to-peer mode and that is used to initiate a current transaction request), the first terminal 10 and/or the second terminal 20 may generate or update their respective lists of transaction manner supported and/or their lists of accounts corresponding to transaction manners, provided that these lists are generated or updated before these lists are sent to the other party or transaction manner matching is performed.

Alternatively, the respective lists of transaction manners supported by the first terminal 10 and/or the second terminal 20 and/or the respective lists of accounts corresponding to transaction manners may be externally obtained, for example, from a cloud server. In this way, a corresponding payment client may not be installed on a terminal currently used by a user, or a terminal is replaced. In this case, a list of transaction manners and/or a list of accounts corresponding to transaction manners may be obtained by means of downloading.

In a possible implementation, after a user registers an account by using a payment client, the first terminal 10 and/or the second terminal 20 may store the account of the user, or store state information that indicates the registered account. Similarly, when the payment client is in a logged-in state or a non-logged-in state, information that indicates the logged-in state or the non-logged-in state may be stored, so that a system may obtain state information of these transaction manners from a storage area during usage.

In a possible implementation, a transaction manner to be negotiated may be identification information of a payment client of the first terminal 10 and/or the second terminal 20. The first terminal 10 and/or the second terminal 20 may quickly determine the transaction manner by identifying content of the identification information.

In a possible implementation, before performing the transaction manner negotiation, the first terminal 10 and/or the second terminal 20 sort/sorts their respective transaction manners supported. Sorting may be performed according to a priority sequence, and a priority may be automatically set or may be manually set by a user. Alternatively, sorting is performed according to a use probability, for example, according to popularity of a payment client. It is assumed that a quantity of users of a first payment client is greater than a quantity of users of a second payment client, the first payment client may be sorted before the second payment client. Alternatively, sorting is performed according to user preference, for example, performed by means of intelligent analysis of a use habit of a user and according to a use frequency of the user. Alternatively, sorting is performed according to an account balance. For example, a transaction manner with a largest balance is sorted in the forefront. Alternatively, sorting may be performed according to a result of matching between a current transaction amount and amount data that is generated when each payment client is previously used each time, or the like. For example, a current transaction amount is RMB 500, a transaction amount generated when a first payment client is previously used each time may range from RMB 200 to RMB 1000, and a transaction amount generated when a second payment client is previously used each time ranges from RMB 0 to RMB 300; in this case, the first payment client may be sorted before the second payment client. The first terminal 10 and the second terminal 20 separately determine a preferentially to-be-used transaction manner according to transaction manner sorting.

Description "before performing the transaction manner negotiation" includes but is not limited to: before sending a transaction manner to the other party (for example, before the first terminal 10 sends at least one transaction manner of the first terminal 10 to the second terminal 20), or before performing transaction manner matching (for example, after the second terminal 20 receives at least one transaction manner sent by the first terminal 10 and before the second terminal 20 performs the transaction manner matching).

In a possible implementation, before performing the transaction manner negotiation, the first terminal 10 and/or the second terminal 20 screen/screens their respective transaction manners supported, and remove/removes a currently unavailable transaction manner. For example:

A payer terminal receives a transaction amount that is entered by a user or automatically generated, or receives a transaction amount sent by the other party, compares an account balance associated with an account corresponding to a transaction manner with an amount of a current transaction, and determines, according to whether the balance is sufficient, whether the transaction manner is available. Alternatively, before a transaction amount is obtained, when a payer terminal determines that an account balance is less than an appropriate amount, for example, when the account balance is 0, it is determined that a transaction manner is unavailable. The determining may be performed as follows: The terminal performs determining according to a stored account balance or the terminal locally performs determining after a server corresponding to the transaction manner obtains the account balance; or the terminal sends the transaction amount to a server corresponding to the transaction manner and performs determining on a side of the server.

Alternatively, when a balance is insufficient, according to whether a transaction manner is bound to another authorized payment account, for example, multiple bank cards associated with a banking application, an entrusted payment account such as add-on pay of Alipay, or a bank deposit card associated with Baidu Wallet, a payer terminal determines whether the transaction manner is available. The determining may be performed before a transaction amount is obtained, or may be directly performed after a transaction amount is obtained.

Alternatively, according to whether a payment client has logged in, whether an account and a password that are used for login are stored, or the like, a payer terminal determines whether a transaction manner is available. For example, when it is determined that an account and a password that are used for login (such as a login password) are not stored, it may be considered that the transaction manner is unavailable; otherwise, it is considered that the transaction manner is available.

Alternatively, according to whether a payment client corresponding to an account and a password that are used for login and that are stored is uninstalled, a payer terminal determines whether a transaction manner is available. For example, when it is determined that an account and a password that are used for login are stored and the corresponding payment client is uninstalled, it may be considered that the transaction manner is unavailable; otherwise, it is considered that the transaction manner is available.

In the foregoing possible implementation, a charge receiver may also perform similar screening.

In a possible implementation, the first terminal 10 and/or the second terminal 20 may separately request each registered and/or logged-in payment client to determine whether an account balance of the payment client is sufficient to complete current transfer payment, or whether each payment client is bound to a deposit card. In another implementation, after each payment client is bound to a deposit card, state information used to indicate that the deposit card is bound is stored in a system, or state information used to indicate that the deposit care is bound or not bound is stored in a system, so that the system may obtain the state information from a storage area during usage.

In a possible implementation, the first terminal 10 first sends the transaction manner 1 and the corresponding account 12 to the second terminal 20, to negotiate whether the transaction manner 1 is available.

In this implementation, the first terminal 10 first sends the transaction manner 1 sorted in the forefront and the corresponding account 11 to the second terminal 20, that is, sends, to the second terminal 20, a transaction manner most expected by the first terminal 10. If the second terminal 20 also supports the transaction manner 1, a transaction is performed in the transaction manner 1, that is, the second terminal 20 may automatically start a payment client corresponding to the transaction manner 1, so as to submit a transaction request to a server corresponding to the transaction manner 1. Certainly, after the payment client corresponding to the transaction manner 1 is started on the second terminal 20, a user is allowed to perform another operation, for example, entering other information related to transaction (such as a transaction amount), selecting a transaction role, selecting a corresponding transaction account 21, or entering a transaction password (if the second terminal is a charge payer). A small volume of data is sent in this implementation, and this is convenient and efficient.

In a possible implementation, the transaction manner 1 is a payment client currently started by the first terminal 10. For example, if a user of the first terminal 10 most expects to use Alipay to perform a transaction, the user starts an Alipay client, and interacts with the second terminal 20 by using an NFC connection. This delivers intuitive operating experience.

If a result returned by the second terminal 20 indicates that the transaction manner 1 is unavailable or the second terminal 20 does not support the transaction manner 1, the first terminal 10 sends remaining transaction manners to the second terminal 20. In this embodiment, the remaining transaction manners are the transaction manner 2 and the transaction manner 3.

In a possible implementation, multiple transaction manners such as the transaction manner 2 and the transaction manner 3 may be sent in a list form, or may be sent one by one.

The second terminal 20 performs matching between a transaction manner sent by the first terminal 10 and a transaction manner supported by the second terminal 20, determines that the transaction manner 2 and the transaction manner 3 are available, selects an available transaction manner from the transaction manner 2 and the transaction manner 3, and returns the selected available transaction manner to the first terminal 10. In this embodiment, the selected available transaction manner is the transaction manner 2.

In a possible implementation, an available transaction manner may be manually selected by a user or may be automatically selected by a terminal. For example, all available transaction manners are listed on a UI, and the user selects a to-be-used transaction manner by means of clicking, or the terminal automatically selects a to-be-used transaction manner according to transaction manner sorting.

In a possible implementation, the second terminal 20 may return, to the first terminal 10, a message indicating that both the transaction manner 2 and the transaction manner 3 are available, so that the first terminal 10 can select a to-be-used transaction manner.

After receiving a message that is sent by the second terminal 20 and that indicates that the transaction manner 2 is to be used, the first terminal 10 sends the account 12 corresponding to the transaction manner 2 to the second terminal 20.

In a possible implementation, alternatively, after the second terminal 20 returns, to the first terminal 10, a message indicating that both the transaction manner 2 and the transaction manner 3 are available, the first terminal 10 may send both the account 12 and the account 13 to the second terminal 20.

The second terminal 20 initiates a transaction request to a server 30 corresponding to the transaction manner 2.

In a possible implementation, the second terminal 20 may initiate the transaction request to the server 30 corresponding to the transaction manner 2 by using various wired or wireless communications technologies mentioned in this specification.

In a possible implementation, the transaction request includes the account 12 of the first terminal 10, the account 22 of the second terminal 20, and a transaction amount.

In a possible implementation, when the second terminal 20 serves as a charge payer, the transaction request may further include a transaction password (such as a payment password) corresponding to the account 22, or other information that can be used by the server 30 corresponding to the transaction manner 2 to perform identification and permission confirmation on the second terminal 20. Alternatively, when the first terminal 10 serves as a charge receiver, the transaction request may further include a transaction password corresponding to the account 12, or other information that can be used by the server 30 corresponding to the transaction manner 2 to perform identification and permission confirmation on the first terminal 10. The transaction password corresponding to the account 12 or the other information that can be used by the server 30 corresponding to the transaction manner 2 to perform identification and permission confirmation on the first terminal 10 is sent by the first terminal 10 to the second terminal 20.

In a possible implementation, the transaction request may further include other information, for example, a user identifier that is used to identify that a user serves as a charge payer or a charge receiver. Alternatively, whether the transaction request initiated by the second terminal 20 is payment or charge receiving can be determined by determining whether a transaction amount is positive or negative.

It should be noted that the foregoing transaction between the first terminal 10 and the second terminal 20 may be a transfer transaction between individual users, or may be a shopping transaction between a consumer and a merchant, or the like. In a scenario of the shopping transaction between a consumer and a merchant, the first terminal 10 or the second terminal 20 that represents the merchant may be a smartphone, or may be a POS machine used for cashiering, or may be a terminal used by a consumer to browse a merchant website during online shopping, such as a personal computer PC or a tablet computer.

The following describes, based on a specific scenario, a process in which a mobile phone user completes payment to a merchant when performing online shopping by using a PC.

Scenario 1:

1. Determine payment on the PC after an online shopping mall (such as Taobao, Tmall, or Jingdong Mall) is opened to purchase a commodity.

2. After a user selects an NFC bump payment function of a payment client (such as Alipay) to perform payment on a payment page of the online shopping mall, the PC instructs the user to place a mobile phone at a designated location of the PC (such as an NFC induction area of the PC).

3. After the user places the mobile phone at the designated location of the PC, the mobile phone starts an Alipay client and instructs the user to enter a password or press a fingerprint without moving. After the user performs an operation according to a prompt, Alipay account information and a payment password are displayed in an account input area and a password input area on the PC (for example, displayed in a form of hiding a real digit or letter), so that the user completes a payment operation on the PC by using Alipay.

An operation of entering a password or a fingerprint on a mobile phone payment client by a user is optional.

Scenario 2:

1-2. The same as operation steps 1 and 2 in the foregoing scenario 1.

3. After the user places the mobile phone at the designated location of the PC, the PC sends order information (such as an order number and/or a merchant charge receiving account) generated on the online shopping mall (that is, a merchant) to the mobile phone, so that the user performs a payment operation on the mobile phone by using an Alipay client (for example, the mobile phone sends the order number to an Alipay server to perform order query, and payment may be performed to the merchant after confirmation is performed).

In the scenario 1, the mobile phone sends, to the PC by using an NFC connection, account information used for payment, and the PC submits a transaction request to a payment server. However, in the scenario 2, the PC sends the order information (which may include information such as the merchant order number and/or the merchant charge receiving account) generated on the online shopping mall to the mobile phone, and the mobile phone submits a transaction request to a payment server.

Figure 14:
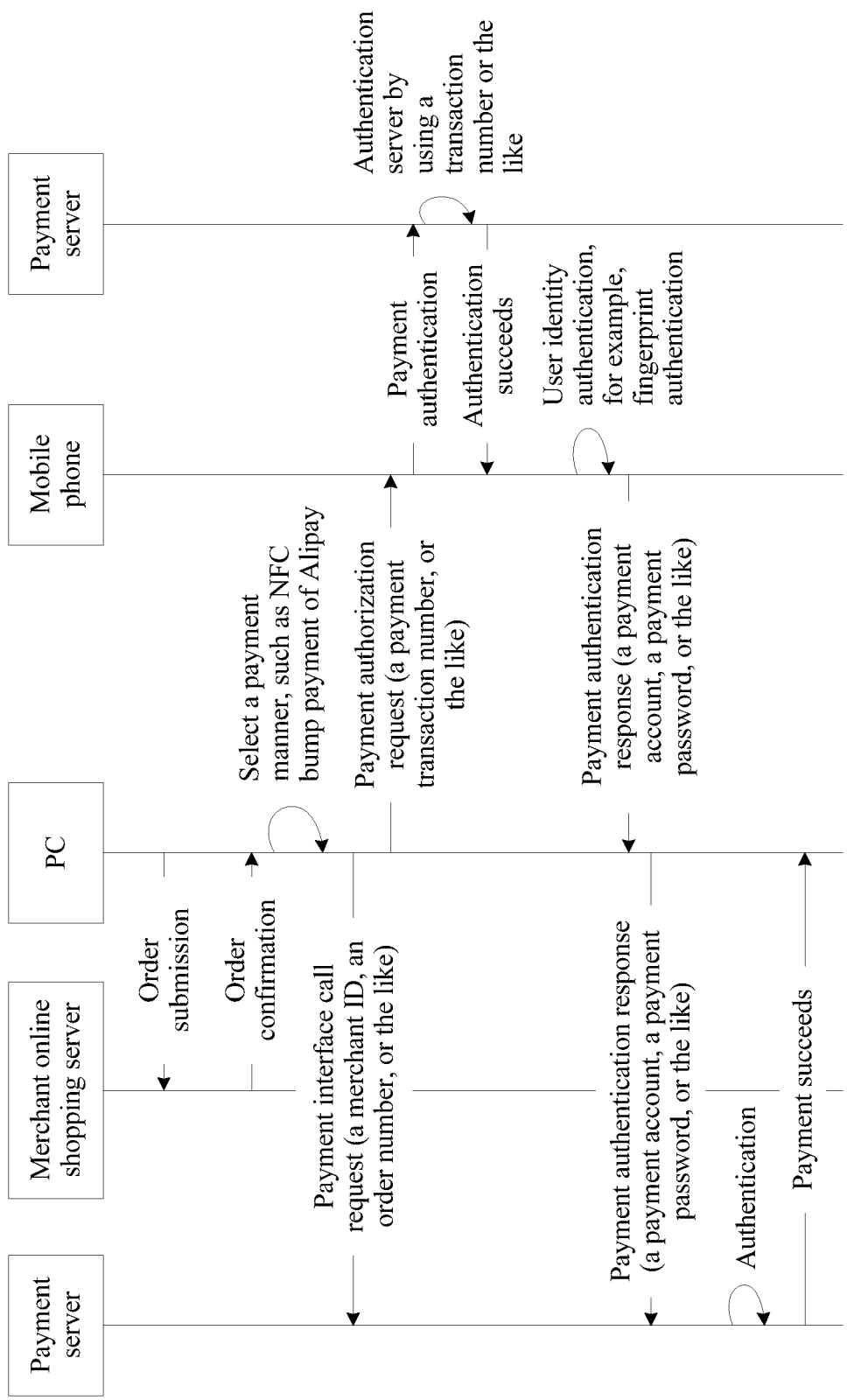
FIG. 14 is an implementation flowchart of a transaction method according to a possible implementation of the present invention.

FIG. 14 is an implementation flowchart corresponding to a possible implementation provided for the scenario 1. As shown in FIG. 14, a first terminal 10 may be a PC, and a second terminal 20 may be a mobile phone. A payment authorization request sent by the first terminal 10 to the second terminal 20 by using an NFC connection may carry payment client identification information (such as an Alipay client identifier). In this way, the second terminal 20 may determine, according to the identification information in a transaction manner supported by the second terminal 20, that the Alipay client exists, so as to automatically start or invoke the payment client. The payment authorization request may further carry a payment transaction number (such as a transaction number generated in an online shopping mall by using an Alipay server) generated in a current transaction. In this way, the second terminal 20 may send the payment transaction number to the Alipay server for authentication. If the authentication succeeds, it is determined that the payment transaction number is trusted, so that the second terminal 20 is triggered to feed back an Alipay account and a corresponding payment password to the first terminal 10. After obtaining a payment account and a payment password of a user that are returned by the first terminal 10, the second terminal 20 directly enters the payment account and the payment password at a designated location (such as an account input area and a password input area) on a payment page. After the user performs confirmation, the payment account and the payment password are sent to a payment server for authentication. If the authentication succeeds, the payment server deducts money from an account balance corresponding to the account, and transfers the money to a merchant account.

It should be noted that when selecting a payment manner on the payment page of the online shopping mall, the user may select to perform payment by using an NFC bump payment function. In this case, the payment authorization request shown in FIG. 14 may carry at least multiple pieces of payment client identification information (such as an Alipay client identifier, a PayPal identifier, and a Google Wallet identifier). In this way, the second terminal 20 may perform matching between a payment client supported by the second terminal 20 and these payment clients sent by the first terminal 10, and identify payment clients that are supported by both the second terminal 20 and the first terminal 10, so as to determine a payment client and then complete the payment. For a specific implementation, refer to the following embodiments. Details are not described herein.

In a possible implementation, content of a transaction request may be automatically generated by a system or may be manually entered by the user.

In a possible implementation, after receiving an account 12, the second terminal 20 automatically starts or invokes a payment client corresponding to a transaction manner 2, and initiates a transaction request to a server 30 corresponding to the transaction manner 2.

It should be noted that the payment client may be invoked in a background, so as to initiate a transaction request to the server 30 corresponding to the transaction manner 2 without affecting normal use of the user.

Alternatively, specific transaction information that is selected or entered by the user may be received after a payment client corresponding to the transaction manner 2 is automatically started or invoked, for example, a to-be-used card selected from multiple bank cards bound to the payment client, a transaction amount, whether a transaction type is charge receiving or payment, or a transaction password.

In a possible implementation, a transaction request is initiated by the second terminal 20, and therefore, a payment client corresponding to a transaction manner and an account of the first terminal 10 may not be installed on the first terminal. A transaction negotiation process may be completed, provided that the transaction manner and the account can be provided to the second terminal 20.

In a possible implementation, a transaction amount may be manually entered by a user, may be automatically obtained by the second terminal 20, or may be received from the first terminal 10. For example, when the second terminal 20 is a POS machine connected to a cash register, the transaction amount is obtained by the second terminal 20 from the cash register, and does not need to be manually entered by the user.

In a possible implementation, a transaction amount that is manually entered by a user may be received, or the second terminal 20 may automatically obtain a transaction amount before the first terminal 10 and the second terminal 20 perform transaction manner negotiation. For example, a UI of the second terminal 20 presents a transaction interface. After receiving a message indicating that users of the first terminal 10 and the second terminal 20 confirm that the transaction amount is correct, the first terminal 10 and the second terminal 20 perform the transaction manner negotiation by using an NFC connection.

In a possible implementation, the first terminal 10 is configured as a charge receiver and/or the second terminal 20 is configured as a charge payer according to a to-be-performed transaction before a negotiation process is performed by using an NFC connection. That is, a payment client installed on a payer terminal is automatically started or invoked after the negotiation process is performed by using an NFC connection (for example, after the first terminal 10 or the second terminal 20 determines a to-be-used transaction manner).

In a possible implementation, after receiving a transaction request sent by the second terminal 20, the server 30 corresponding to the transaction manner 2 may send a confirmation request to the first terminal 10. After receiving a confirmation instruction sent by the first terminal 10, the server 30 corresponding to the transaction manner 2 performs a transaction.

In this implementation, a terminal receives confirmation performed by a user on a transaction, thereby improving security. In particular, when the transaction request initiated by the second terminal 20 that serves as a charge receiver is a charge receiving request, the first terminal 10 used as a charge payer performs confirmation, so as to ensure property security of the user.

In a possible implementation, the confirmation instruction further includes a password corresponding to the account 12, or other information that can be used to perform identification on the first terminal 10 by the server 30 corresponding to the transaction manner 2.

It should be noted that, optionally, a transaction confirmation process may be applied to all embodiments of the present invention, and other accompanying drawings are not drawn.

In a possible implementation, if a transaction fails for reasons such as an insufficient balance or a permission limitation, the server 30 corresponding to the transaction manner 2 sends, to the second terminal 20, a message indicating that the transaction fails. The second terminal 20 sends a remaining available transaction manner to the first terminal 10, and the remaining available transaction manner is a transaction manner 3 in this implementation. The first terminal 10 returns an account 13 corresponding to the transaction manner 3 to the second terminal 20. The second terminal 20 initiates a transaction request to a server corresponding to the transaction manner 3.

In a possible implementation, the transaction request includes an account 13 of the first terminal 10, an account 23 of the second terminal 20, and a transaction amount.

In a possible implementation, the server 30 corresponding to the transaction manner 2 further sends, to the first terminal 10, a message indicating a transaction failure.

In a possible implementation, information sent in any one or more steps in a process of negotiation between the first terminal 10 and the second terminal 20 may be automatically sent, or may be returned in response to a request received from the other party.

In a possible implementation, the method further includes: sending, by the second terminal 20, the transaction request to the first terminal 10; and forwarding, by the first terminal 10, the transaction request to a server 30 corresponding to a transaction manner selected by means of negotiation.

Figure 2:
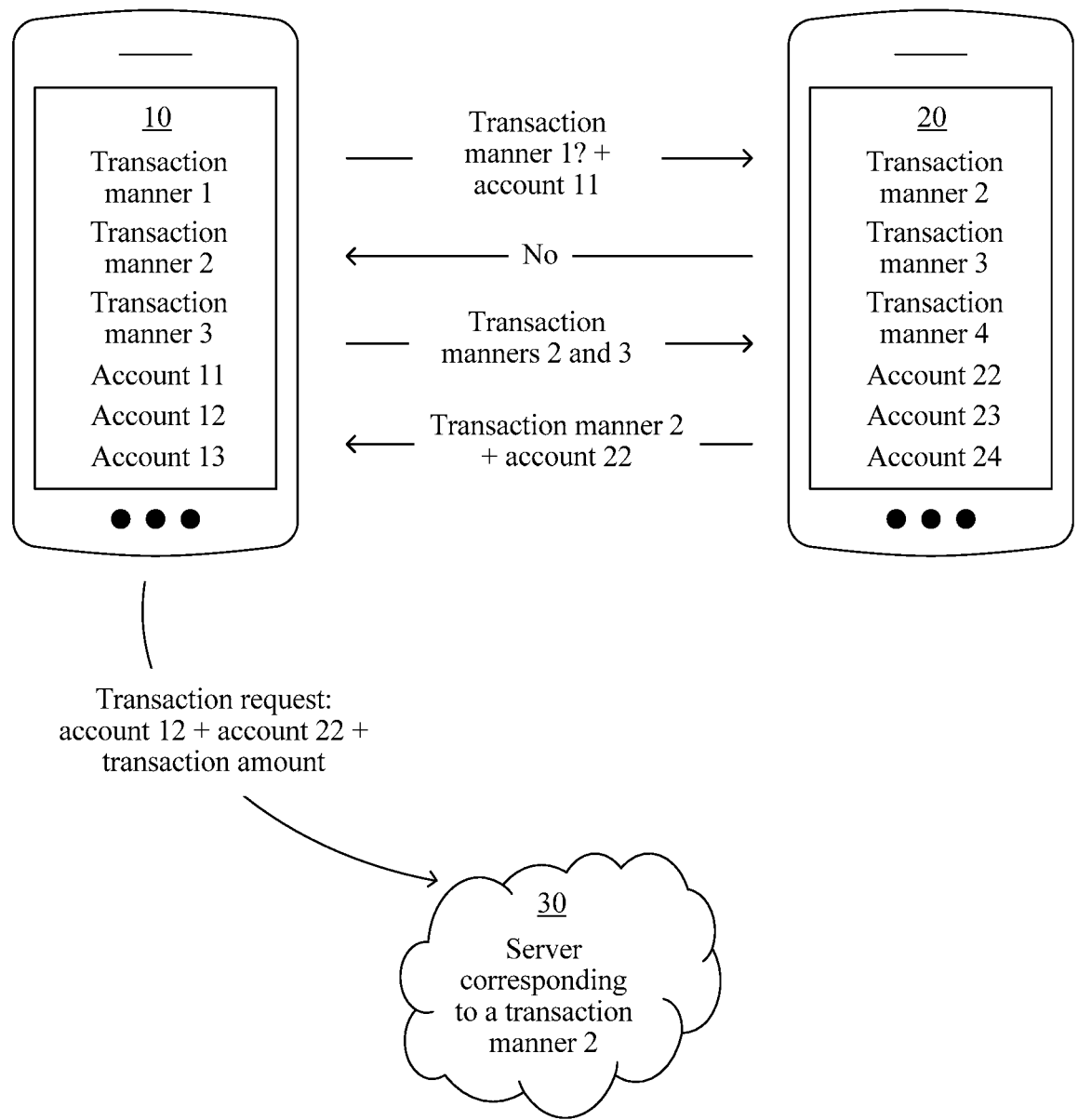
FIG. 2 is a schematic diagram of a transaction method according to another possible implementation of the present invention.

FIG. 2 is a schematic diagram of a transaction method according to another possible implementation of the present invention. As shown in FIG. 2, a similarity between this implementation and an implementation shown in FIG. 1 is not described. Unlike FIG. 1, after identifying that available transaction manners are a transaction manner 2 and a transaction manner 3, a second terminal 20 sends both a message indicating that the transaction manner 2 is selected and a corresponding account 22 to a first terminal 10. The first terminal 10 initiates a transaction request to a server 30 corresponding to the transaction manner 2.

It should be noted that simultaneous sending described in this application may indicate that multiple pieces of information are packaged and sent together, or multiple pieces of information are sent one by one.

Figure 3:
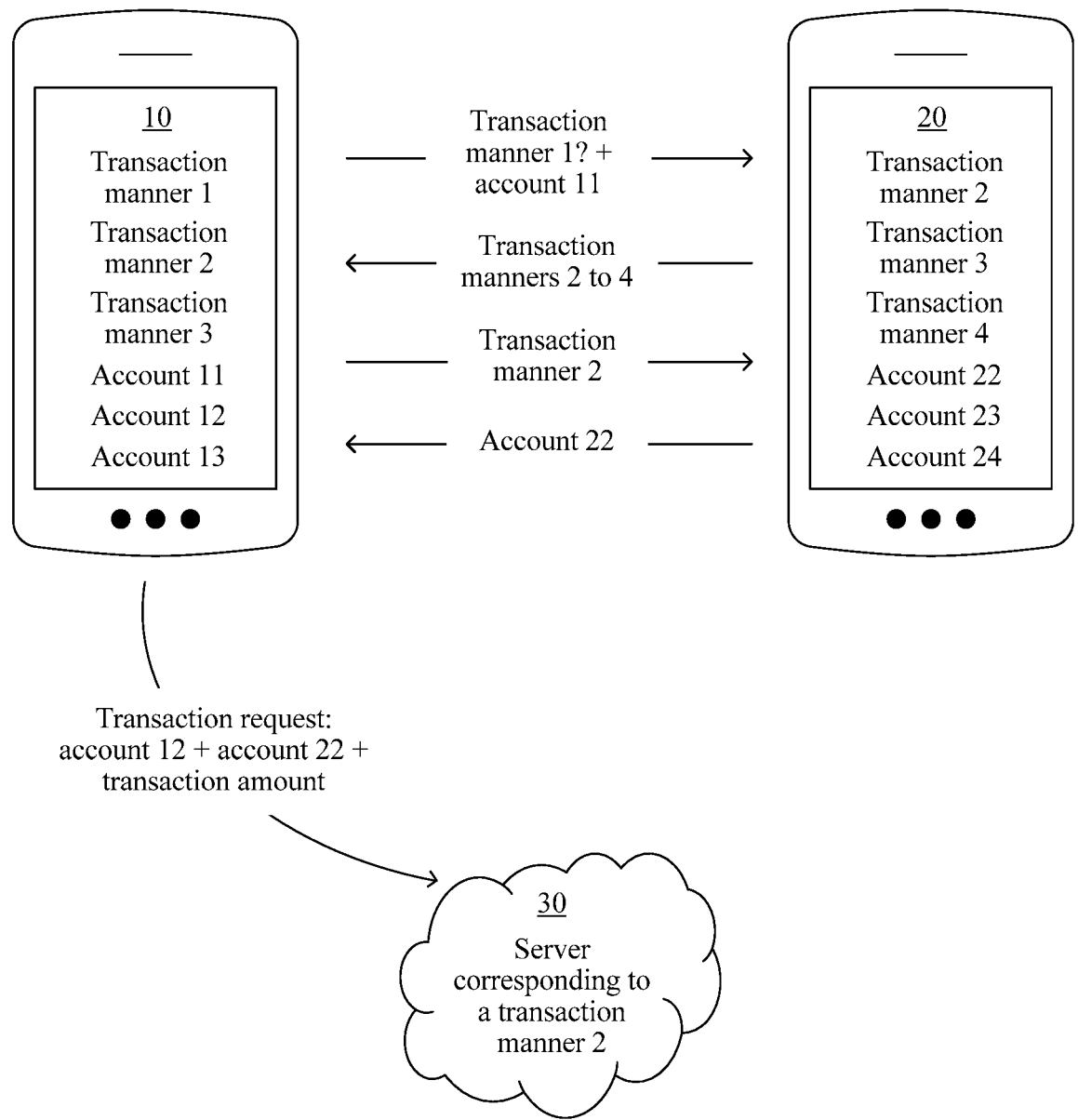
FIG. 3 is a schematic diagram of a transaction method according to still another possible implementation of the present invention.

FIG. 3 is a schematic diagram of a transaction method according to still another possible implementation of the present invention. As shown in FIG. 3, a similarity between this implementation and an implementation shown in FIG. 1 is not described. Unlike FIG. 1, after determining that a transaction manner 1 is unavailable, a second terminal 20 returns, to a first terminal 10, a list of transaction manners supported by the second terminal 20. The transaction manners include a transaction manner 2, a transaction manner 3, and a transaction manner 4.

In a possible implementation, after determining that the transaction manner 1 is unavailable, the second terminal 20 returns, to the first terminal 10, the list of transaction manners supported by the second terminal 20. The transaction manners may include any one or more of the transaction manner 2, the transaction manner 3, or the transaction manner 4.

In this implementation, the first terminal 10 performs matching on available transaction manners in a list of transaction manners supported by two terminals. The first terminal 10 identifies that available transaction manners are the transaction manner 2 and the transaction manner 3, and returns, to the second terminal 20, a message indicating that the transaction manner 2 is selected for use.

After receiving the message indicating that a to-be-used transaction manner is the transaction manner 2, the second terminal 20 sends an account 22 of the transaction manner 2 corresponding to the second terminal 20 to the first terminal 10.

The first terminal 10 initiates a transaction request to a server 30 corresponding to the transaction manner 2.

Figure 4:
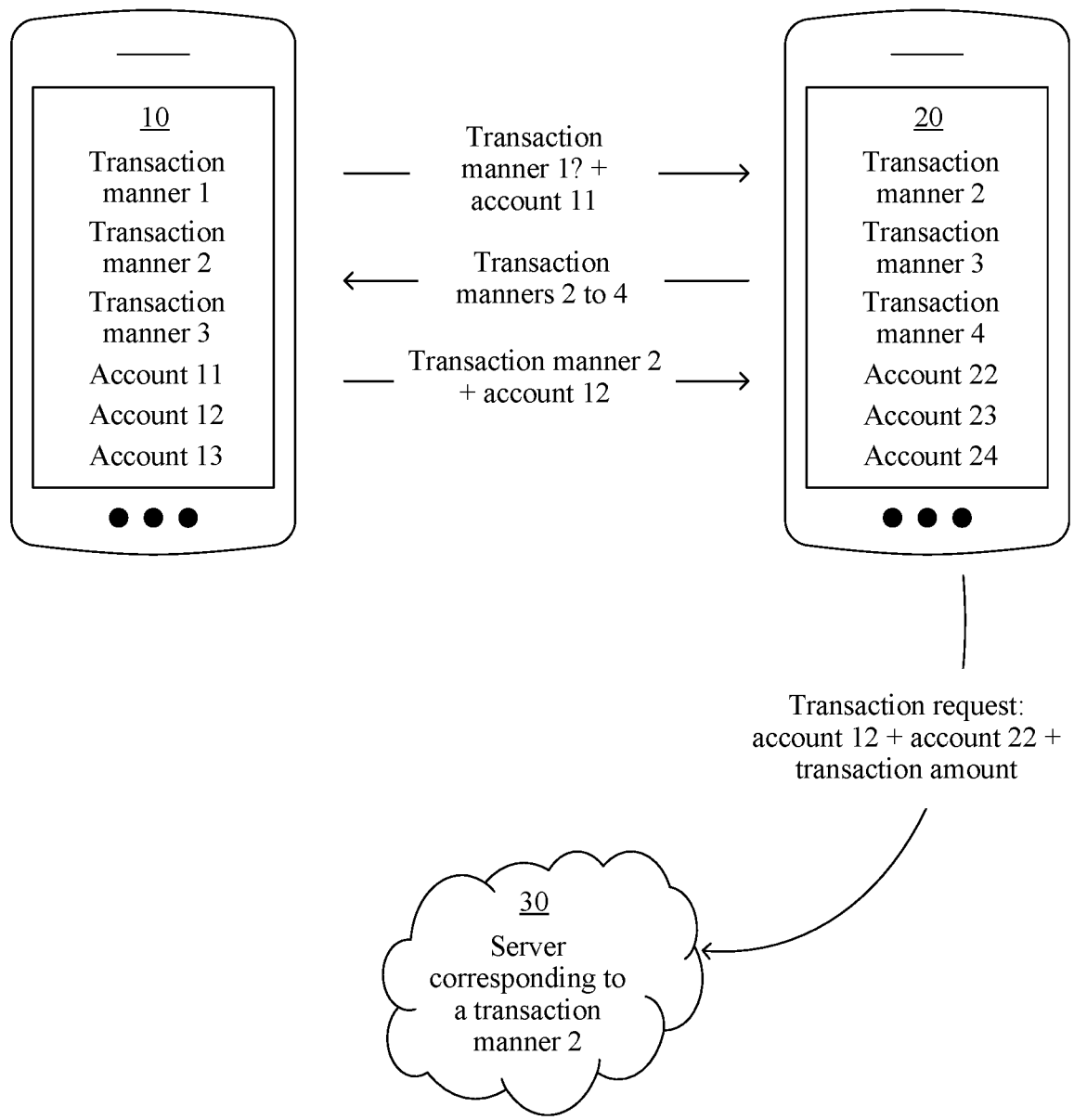
FIG. 4 is a schematic diagram of a transaction method according to still another possible implementation of the present invention.

FIG. 4 is a schematic diagram of a transaction method according to still another possible implementation of the present invention. As shown in FIG. 4, a similarity between this implementation and an implementation shown in FIG. 3 is not described. Unlike FIG. 3, after identifying that available transaction manners are a transaction manner 2 and a transaction manner 3, a first terminal 10 sends both a message indicating that the transaction manner 2 is selected and a corresponding account 12 to a second terminal 20. The second terminal 20 initiates a transaction request to a server 30 corresponding to the transaction manner 2.

Figure 5:
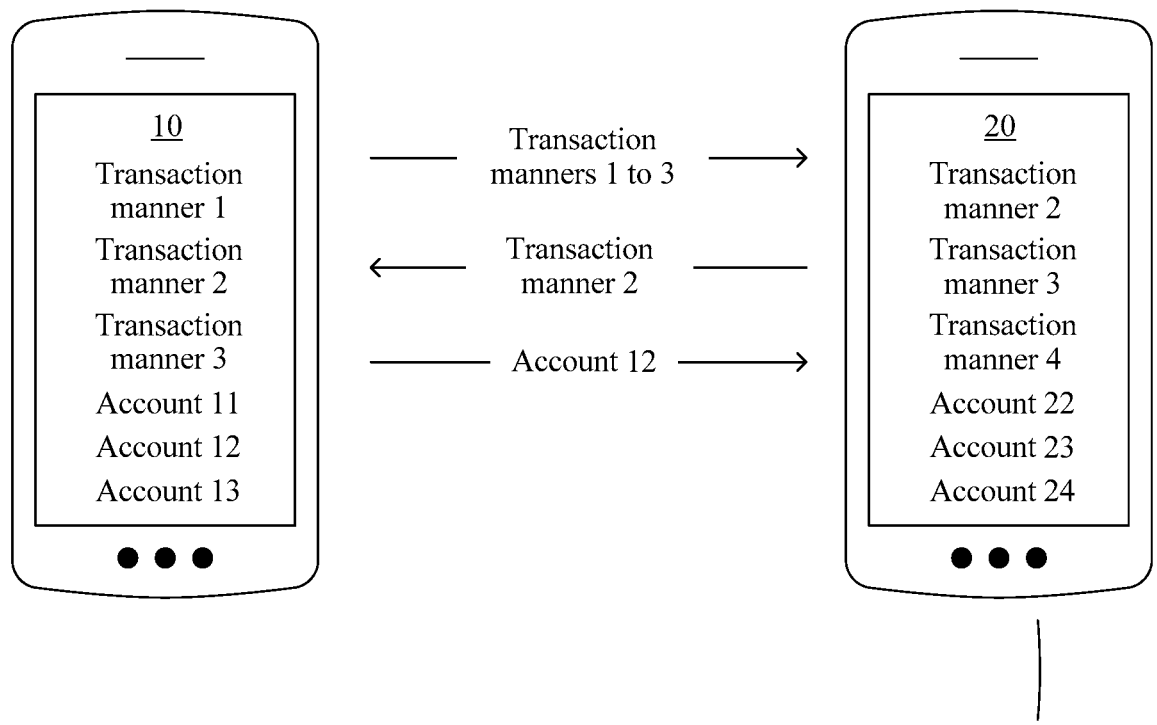
FIG. 5 is a schematic diagram of a transaction method according to still another possible implementation of the present invention.
Figure 5:
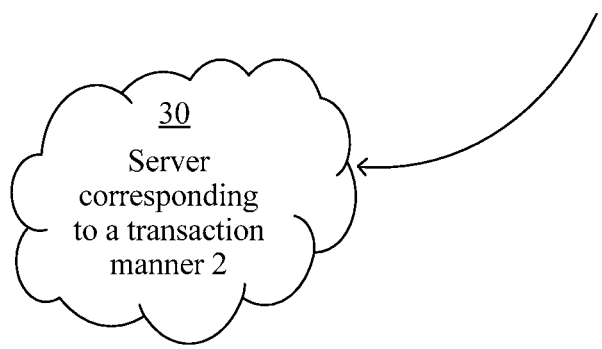

FIG. 5 is a schematic diagram of a transaction method according to still another possible implementation of the present invention. As shown in FIG. 5, a similarity between this implementation and an implementation shown in FIG. 1 is not described. Unlike FIG. 1, a first terminal 10 does not first send a most expected transaction manner 1 and an account 11 to a second terminal 20, so as to attempt to achieve quick matching. Instead, the first terminal 10 sends all supported transaction manners (the transaction manner 1, a transaction manner 2, and a transaction manner 3) to the second terminal 20.

The second terminal 20 performs matching between a transaction manner supported by the first terminal 10 and a transaction manner supported by the second terminal 20, that is, determines whether any transaction manner is supported by both the second terminal and the first terminal. After identifying that available transaction manners are the transaction manner 2 and the transaction manner 3, the second terminal 20 sends, to the first terminal 10, a message indicating that the transaction manner 2 is selected.

The first terminal 10 sends an account 12 corresponding to the transaction manner 2 to the second terminal 20.

The second terminal 20 initiates a transaction request to a server 30 corresponding to the transaction manner 2.

In this implementation, after the second terminal 20 obtains an available transaction manner by means of matching, the first terminal 10 sends an account to the second terminal 20, so as to keep confidentiality of user information and improve security.

Figure 6:
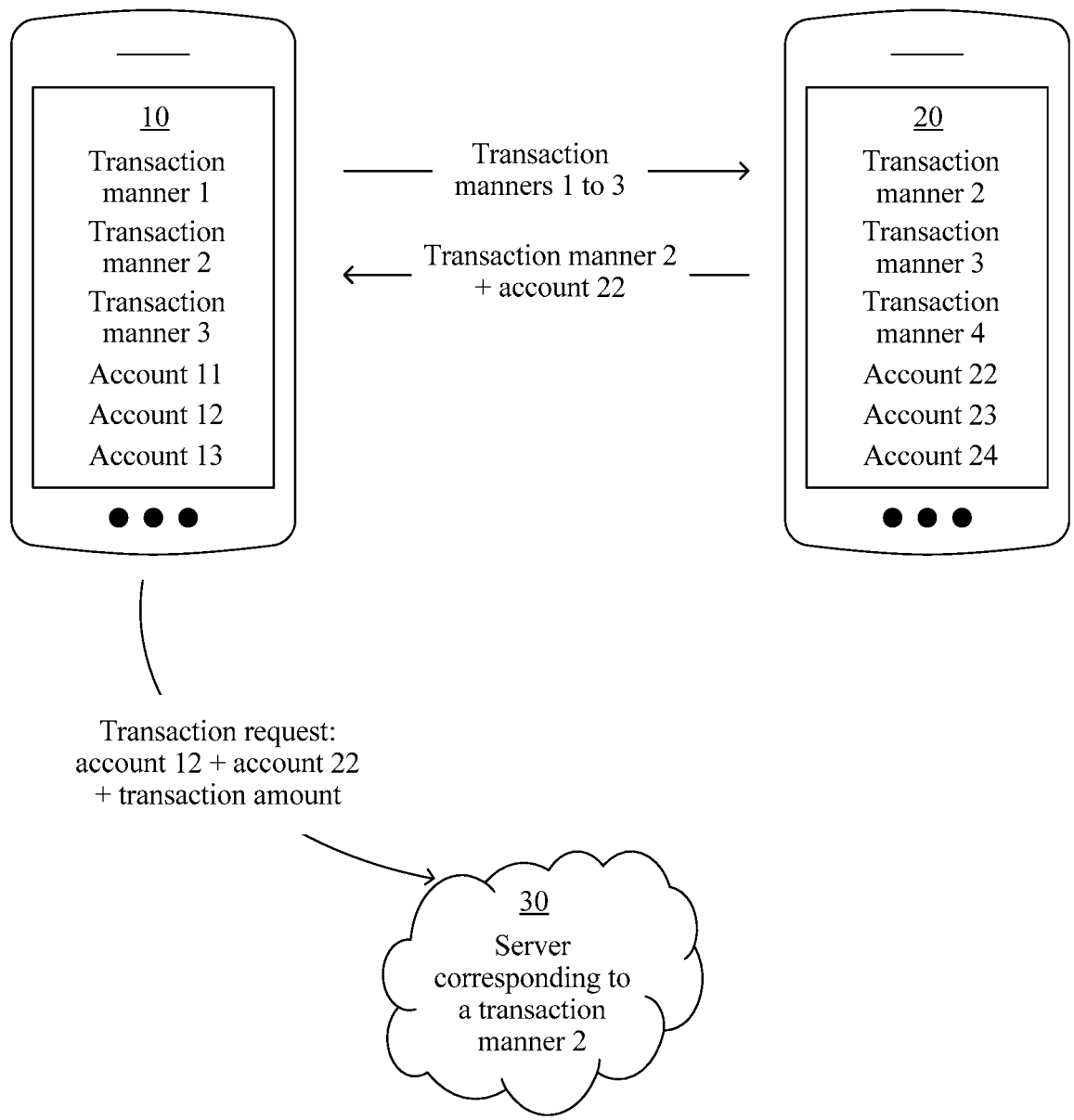
FIG. 6 is a schematic diagram of a transaction method according to still another possible implementation of the present invention.

FIG. 6 is a schematic diagram of a transaction method according to still another possible implementation of the present invention. As shown in FIG. 6, a similarity between this implementation and an implementation shown in FIG. 5 is not described. Unlike FIG. 5, a second terminal 20 performs matching between a transaction manner supported by a first terminal 10 and a transaction manner supported by the second terminal 20. After identifying that available transaction manners are a transaction manner 2 and a transaction manner 3, the second terminal 20 sends both a message indicating that the transaction manner 2 is selected and a corresponding account 22 to the first terminal 10.

The first terminal 10 initiates a transaction request to a server 30 corresponding to the transaction manner 2.

Figure 7:
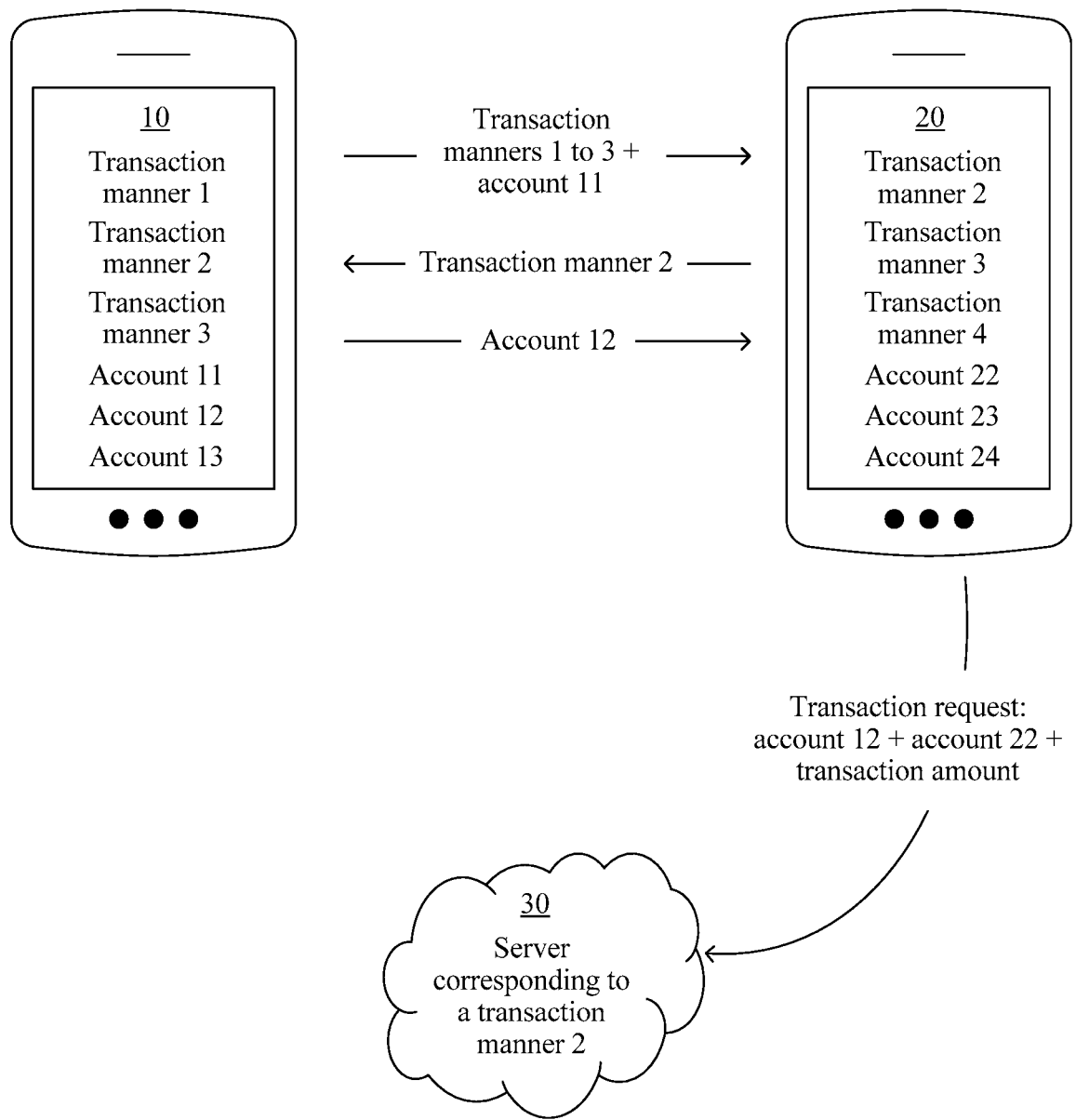
FIG. 7 is a schematic diagram of a transaction method according to still another possible implementation of the present invention.

FIG. 7 is a schematic diagram of a transaction method according to still another possible implementation of the present invention. As shown in FIG. 7, a similarity between this implementation and an implementation shown in FIG. 5 is not described. Unlike FIG. 5, a first terminal 10 sends all supported transaction manners (a transaction manner 1, a transaction manner 2, and a transaction manner 3) and an account 11 corresponding to the transaction manner 1 to a second terminal 20.

In this embodiment, if an available transaction manner obtained by the second terminal 20 by means of matching includes the transaction manner 1, the second terminal 20 initiates a transaction request to a server corresponding to the transaction manner 1, thereby improving payment efficiency. If an available transaction manner obtained by the second terminal 20 by means of matching does not include the transaction manner 1, the second terminal 20 may select another matched transaction manner, that is, a transaction manner supported by terminals of both parties, for example, the transaction manner 2 or the transaction manner 3.

When the available transaction manner obtained by the second terminal 20 by means of matching does not include the transaction manner 1, for example, when available transaction manners obtained by means of matching are the transaction manner 2 and the transaction manner 3, the second terminal 20 sends, to the first terminal 10, a message indicating that the transaction manner 2 is selected.

The first terminal 10 sends an account 12 corresponding to the transaction manner 2 to the second terminal 20.

The second terminal 20 initiates a transaction request to a server 30 corresponding to the transaction manner 2.

Figure 8:
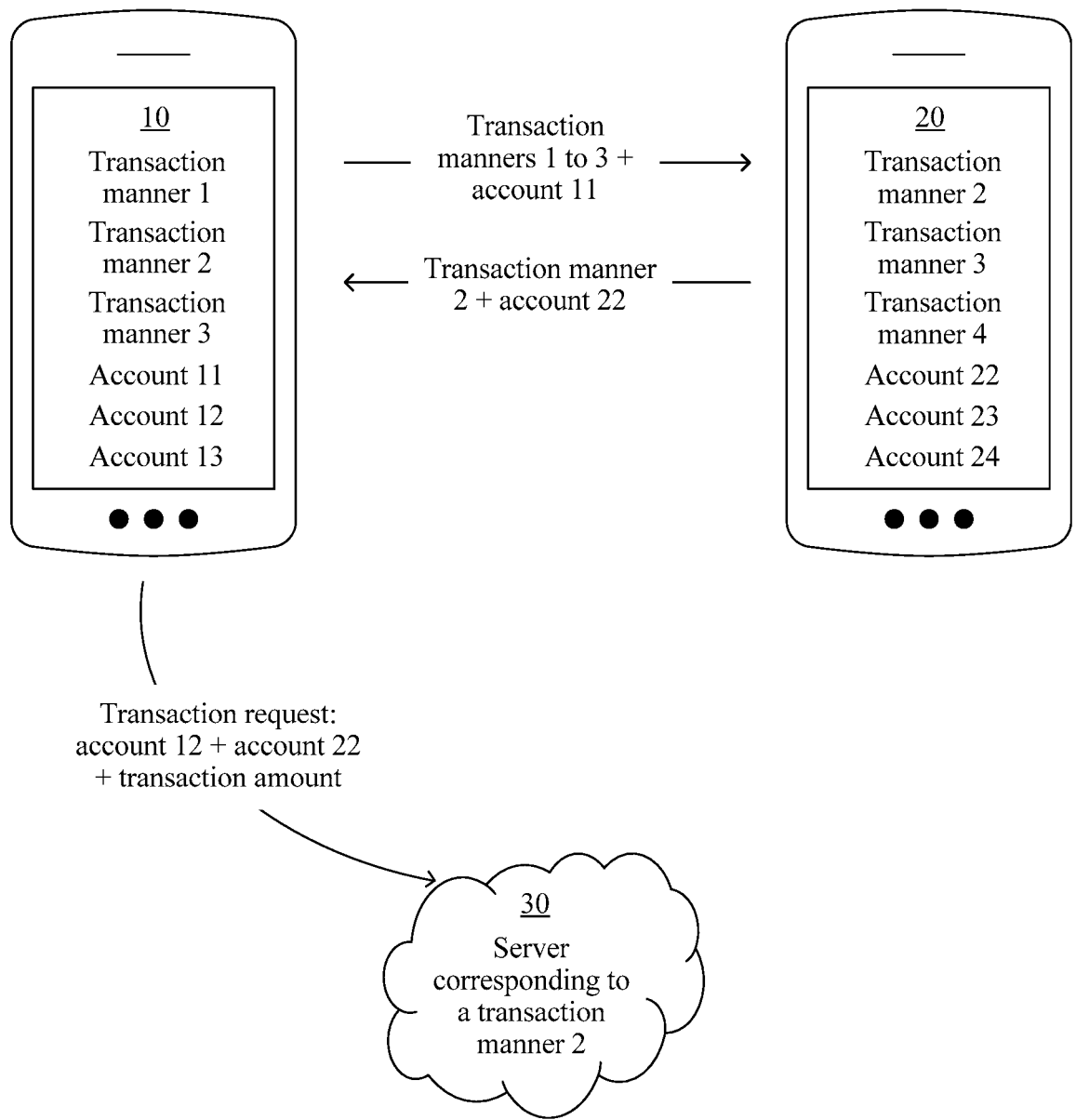
FIG. 8 is a schematic diagram of a transaction method according to still another possible implementation of the present invention.

FIG. 8 is a schematic diagram of a transaction method according to still another possible implementation of the present invention. As shown in FIG. 8, a similarity between this implementation and an implementation shown in FIG. 7 is not described. Unlike FIG. 7, a second terminal 20 performs matching between a transaction manner supported by a first terminal 10 and a transaction manner supported by the second terminal 20. After identifying that available transaction manners are a transaction manner 2 and a transaction manner 3, the second terminal 20 sends both the selected transaction manner 2 and a corresponding account 22 to the first terminal 10.

The first terminal 10 initiates a transaction request to a server 30 corresponding to the transaction manner 2.

Figure 9:
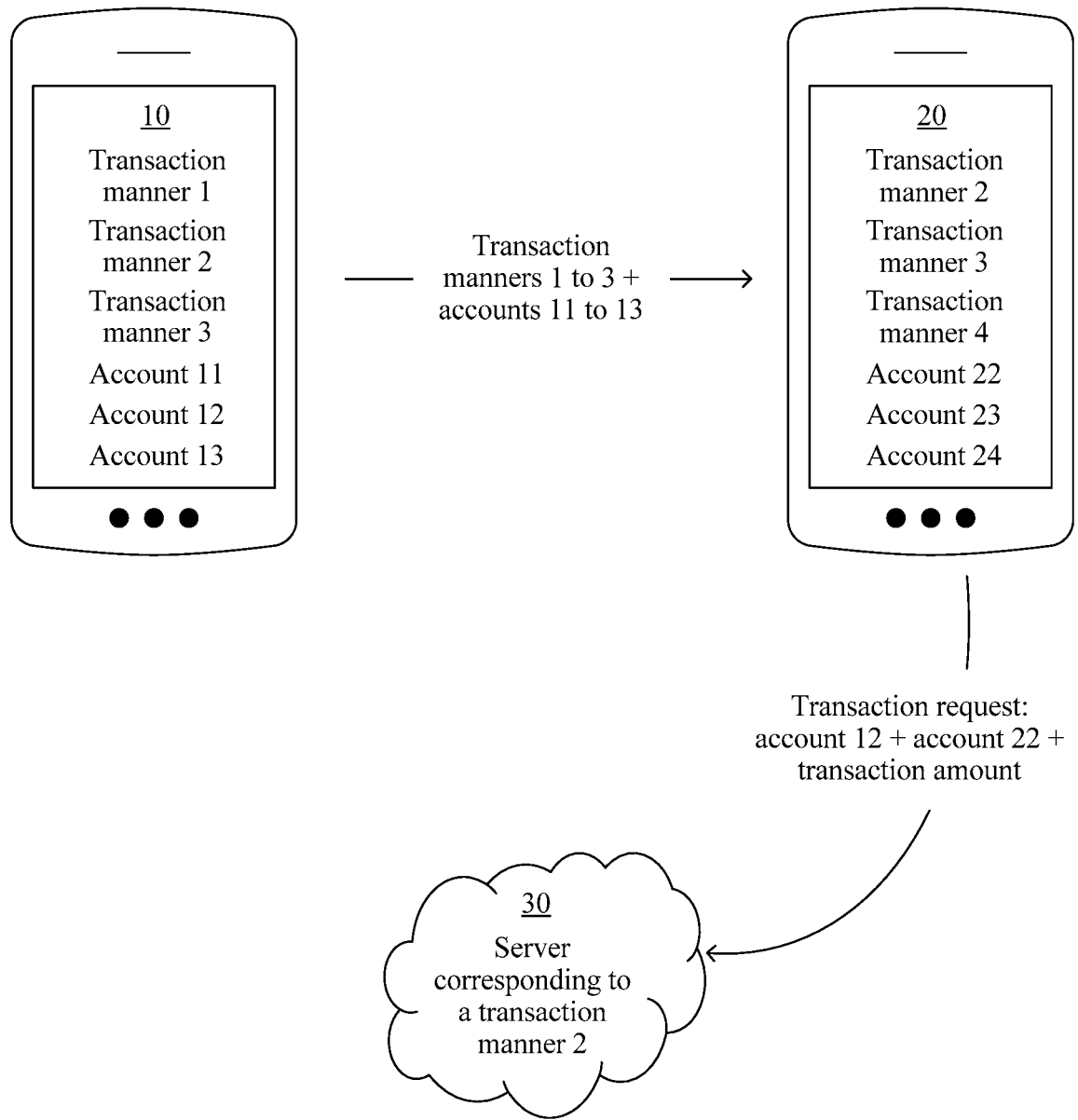
FIG. 9 is a schematic diagram of a transaction method according to still another possible implementation of the present invention.

FIG. 9 is a schematic diagram of a transaction method according to still another possible implementation of the present invention. As shown in FIG. 9, a similarity between this implementation and an implementation shown in FIG. 1 is not described. Unlike FIG. 1, a first terminal 10 sends, to a second terminal 20, all supported transaction manners (a transaction manner 1, a transaction manner 2, and a transaction manner 3), and an account 11, an account 12, and an account 13 that are respectively corresponding to the transaction manner 1, the transaction manner 2, and the transaction manner 3.

The second terminal 20 performs matching between a transaction manner supported by the first terminal 10 and a transaction manner supported by the second terminal 20. After identifying that available transaction manners are the transaction manner 2 and the transaction manner 3, a transaction manner selected by the second terminal 20 is the transaction manner 2.

The second terminal 20 initiates a transaction request to a server 30 corresponding to the transaction manner 2.

In this implementation, interaction needs to be performed only once between the first terminal 10 and the second terminal 20. After obtaining all the transaction manners supported by the first terminal 10 and the accounts corresponding to all the transaction manners from the first terminal 10, the second terminal 20 obtains the available transaction manners by means of matching, selects a transaction manner from the available transaction manners, and sends, to a server corresponding to the selected transaction manner, both an account of the transaction manner selected by the first terminal 10 and the second terminal 20 and a transaction amount.

It should be noted that multiple embodiments of this application may be combined with one another. When obtaining one or more transaction manners by means of matching (that is, two terminals performing NFC communication both support one or more transaction manners), a terminal performing matching may select a to-be-used transaction manner, and then send a corresponding account to the other terminal or request the other terminal to obtain an account of the other terminal. Alternatively, a terminal performing matching may send an available transaction manner obtained by means of matching to the other terminal, or may send an available transaction manner obtained by means of matching and an account corresponding to the transaction manner to the other terminal, and then the other terminal selects the to-be-used transaction manner. When multiple transaction manners and/or multiple accounts corresponding to transaction manners need to be sent, all or some of the multiple transaction manners and/or accounts can be sent.

Figure 10:
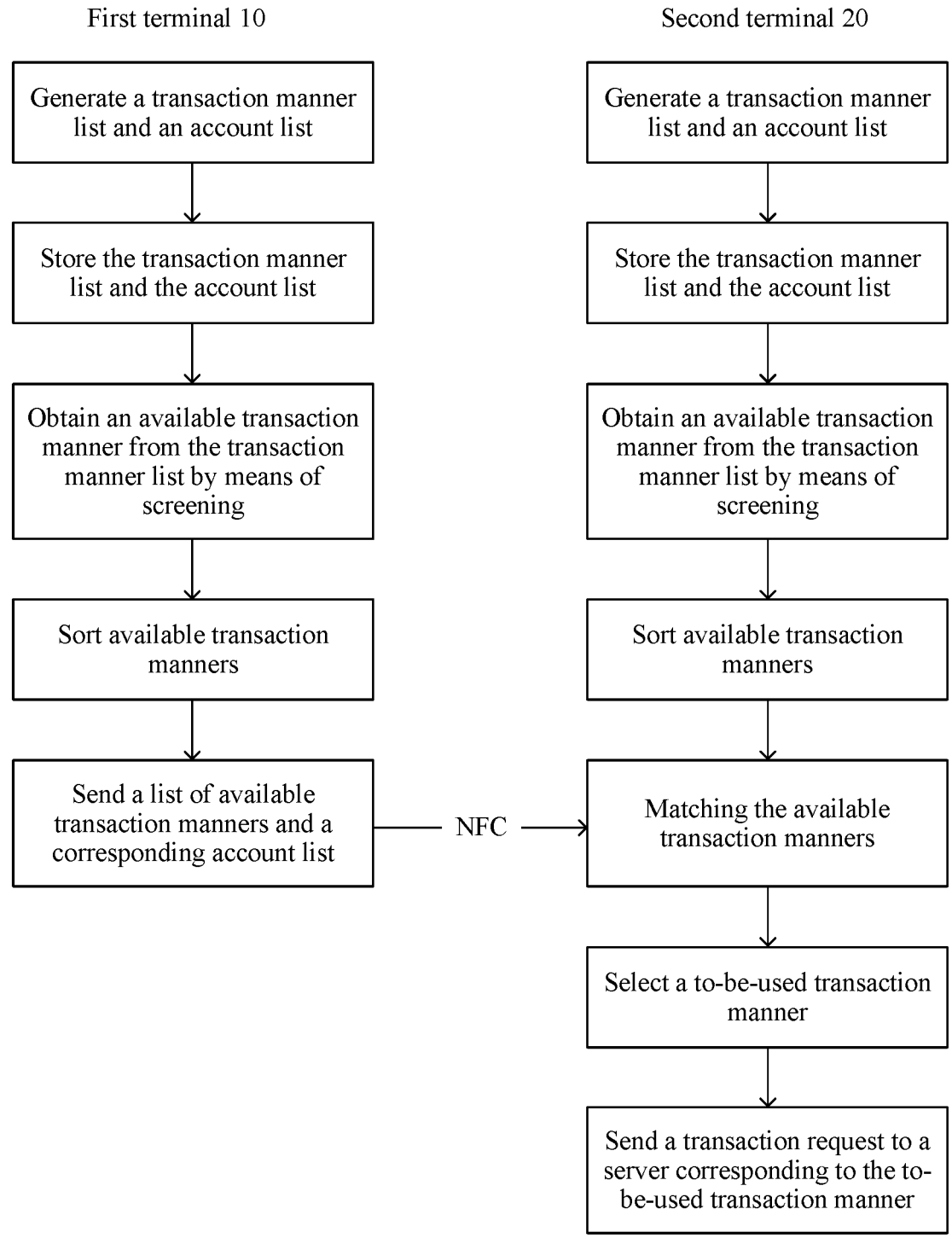
FIG. 10 is an implementation flowchart of a transaction method according to a possible implementation of the present invention.

FIG. 10 is an implementation flowchart of a transaction method according to a possible implementation of the present invention. As shown in FIG. 10, a first terminal 10 and a second terminal 20 separately generate a transaction manner list and a corresponding account list, store the transaction manner list and the corresponding account list, screen available transaction manners from the transaction manner list to obtain an available transaction manner list, and then sort the available transaction manners in the available transaction manner list. Then, the first terminal 10 sends the available transaction manner list and an account list corresponding to each available transaction manner in the available transaction manner list to the second terminal 20. The second terminal 20 performs matching on available transaction manner lists of two terminals, to obtain at least one matched transaction manner. The second terminal 20 selects a to-be-used transaction manner from the at least one matched transaction manner, and sends a transaction request to a server corresponding to the to-be-used transaction manner.

In this embodiment of the present invention, a transaction manner and an account may be in a one-to-one correspondence, or may not be in a one-to-one correspondence. For example, multiple transaction manners correspond to one account. That an account is a mobile phone number or an email address is used as an example. The mobile phone number or the email address may be used to register an Alipay account, a PayPal account, so as to correspond to multiple transaction manners such as Alipay and PayPal. Alternatively, that an account is a bank card number is used as an example. The bank card number may be bound to an Alipay account, a PayPal account, and the like, so as to correspond to multiple transaction manners such as Alipay and PayPal.

In this embodiment of the present invention, if account information used by a terminal includes bank card information, after a payment client is determined as a first transaction manner for performing a current transaction, a terminal that submits a transaction request to a server corresponding to the first transaction manner needs to first determine that the first transaction manner supports a transaction by using a bank card (for example, supports transfer of money to a bank card account or supports payment or charging receiving by using a bank card account). Further, if a terminal that uses bank card information as account information is a terminal that submits a transaction request to a server, the terminal determines that the first transaction manner supports a transaction by using a bank card; or if a terminal that uses bank card information as account information is not a terminal that submits a transaction request to a server, the terminal that uses bank card information as account information determines, before sending the bank card information to the other terminal, that the first transaction manner supports a transaction by using the bank card; and/or the terminal that submits a transaction request to a server determines, after receiving the bank card information sent by the other terminal, that the first transaction manner supports a transaction by using the bank card. For example, a payee terminal may send the bank card information (a card number, and an optional name) used for charge receiving to a payer terminal. After the payer terminal determines to use the first transaction manner or the other terminal instructs the payer terminal to use the first transaction manner, the payer terminal enters, automatically or based on a user operation (for example, selecting the payment client by means of clicking), the bank card information into a corresponding input box on a user interface UI provided by the payment client, and may complete transfer after the charge payer performs confirmation. For another example, details are not described herein. This embodiment of the present invention imposes no limitation.

In addition, this embodiment of the present invention may be further applied to a scenario in which a user transfers a bank card bonus point, a membership card bonus point (such as an Alipay membership card bonus point), an electronic ticket (such as a coupon, a voucher, or a ticket), or the like. For example, when bonus point transfer is performed, it indicates that a quantity of to-be-transferred bonus points may be used as a transaction amount, or may be used as additional information of a transaction amount. When a coupon is transferred (such as a coupon purchased or downloaded by using an Alipay server), information about the coupon (such as a consumption code) may be used as account information, or may be used as additional information of account information. In implementation, when two terminals perform message exchange by using an NFC connection, additional information may be added to an exchanged message, so as to indicate whether funds, or a bonus point, or a coupon is to be transferred in a current transaction. This embodiment of the present invention imposes no limitation thereto.

Figure 15:
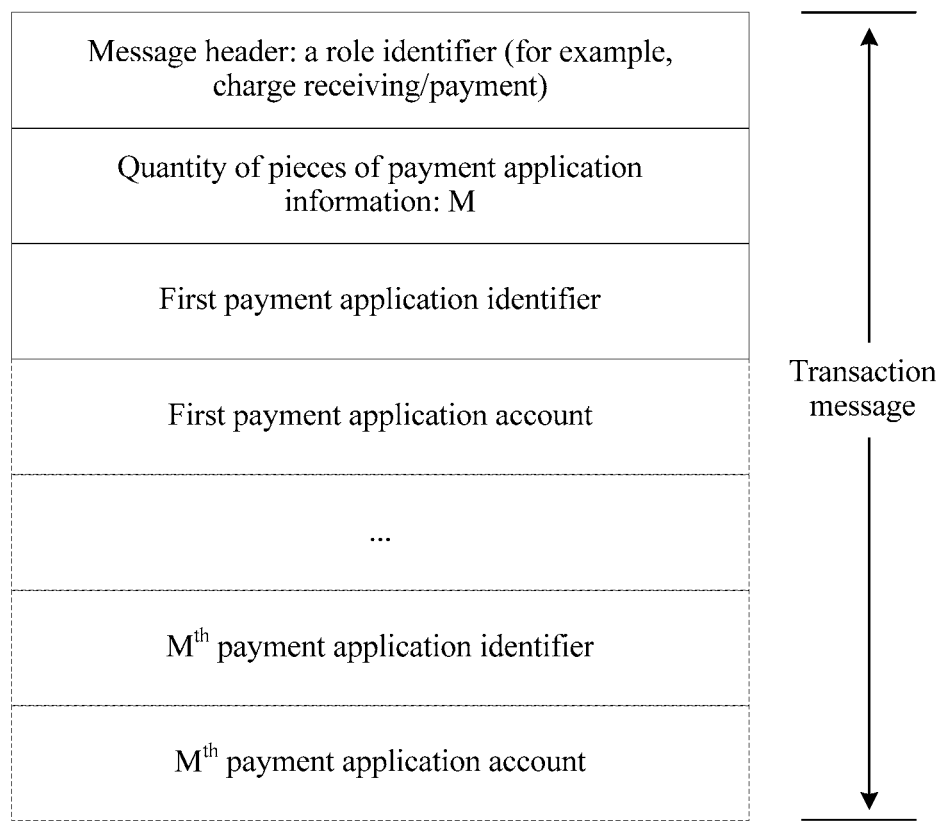
FIG. 15 is a structural diagram of a format of a message exchanged between a first terminal and a second terminal according to a possible implementation of the present invention.

FIG. 15 is a structural diagram of a message exchanged between a first terminal 10 and a second terminal 20 according to a possible implementation of the present invention. A transaction message exchanged between the first terminal 10 and the second terminal 20 may include a message header (such as an NFC data exchange format record, that is, an NDEF record), or may further include multiple message fields (such as an NFC data exchange format record, that is, an NDEF record). The message header may carry a role identifier (such as an identifier of a charge payer or an identifier of a charge receiver) used to identify a message sender in a current transaction. The NDEF record is used to carry or include information that indicates a quantity of transaction manners in FIG. 1 to FIG. 10, and used to identify identification information (such as a payment application identifier) of a transaction manner, even account information (such as a payment application account) corresponding to the transaction manner. In FIG. 15, that M payment application identifiers and M corresponding accounts are carried is used as an example. M is an integer greater than 0. The NDEF records marked by dashed lines are optional. A corresponding meaning is that a terminal (for example, the first terminal 10) may send the M payment application identifiers (M≥1) to the other terminal (for example, the second terminal 20) by using the message format; may send, by using the message format, the M payment application identifiers and the M payment application accounts corresponding to the M payment application identifiers (M≥1) to the other terminal; or may send, by using the message format, the M payment application identifiers and N payment application accounts corresponding to N transaction manners (M≥1, and N<M) to the other terminal.

Figure 16:
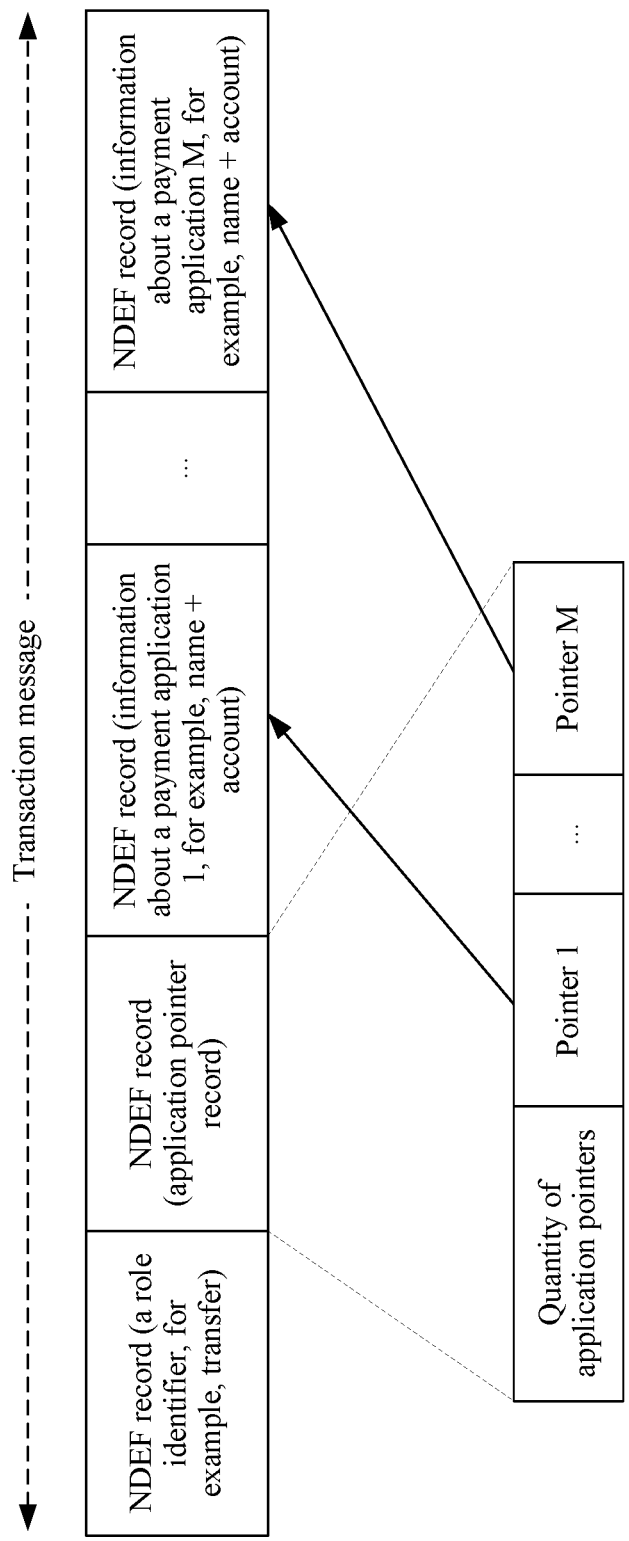
FIG. 16 is a structural diagram of a format of a message exchanged between a first terminal and a second terminal according to another possible implementation of the present invention.

FIG. 16 is another structural diagram of a message exchanged between a first terminal 10 and a second terminal 20 according to a possible implementation of the present invention. A transaction message shown in the figure is formed by multiple NDEF records. A first NDEF record may be the message header in FIG. 15, and a second NDEF record may include M pointers. Each pointer may point to a subsequent NDEF record used to carry a payment application identifier (and a payment application account corresponding to the payment application identifier). Therefore, when a terminal (specifically, an NFC unit or an NFC function module of the terminal that may receive or send, by using an NFC antenna, a message in the foregoing format) performs parsing after receiving the transaction message, the terminal may find information related to a transaction manner by using each pointer, so that the terminal may perform a transaction manner matching operation.

FIG. 15 and FIG. 16 are only an example of designing the format of the message exchanged between the first terminal 10 and the second terminal 20 in this embodiment of the present invention. This embodiment of the present invention imposes no limitation on another design manner. For example, a role identifier is used as additional information and included in a subsequent additional field, or protocol version information is included in the message header.

In this embodiment of the present invention, the message exchanged between the first terminal 10 and the second terminal 20 by using an NFC connection may be a message sent by the first terminal 10 to the second terminal 20, or may be a message sent by the second terminal 20 to the first terminal 10. The message may be transmitted in reader/writer R/W mode or peer-to-peer P2P mode. For example, the second terminal 10 operates in R/W mode and sends a read command read command to the first terminal 10, so as to read information in an NFC tag stored by the first terminal 10 (that is, the first terminal 10 returns the information in the NFC tag to the second terminal 20 as the NFC tag). For another example, the first terminal 10 operates in P2P mode and sends a request message to the second terminal, and the request message may carry a transaction manner and/or corresponding account information, as described in any embodiment in FIG. 1 to FIG. 10. Then, the second terminal feeds back a response message to the second terminal in P2P mode, and the response message may carry information used to determine a to-be-used transaction manner, and corresponding account information or other information, as described in any embodiment in FIG. 1 to FIG. 10. In this mode, the request message sent by the first terminal 10 to the second terminal 20 or the response message fed back by the second terminal 20 to the first terminal may be encapsulated into at least one information protocol data unit IPDU (the IPDU is a data unit that is defined in a Logical Link Control Protocol LLCP formulated by the NFC Forum and that is used to carry information), and transmitted by using an LLCP data link connection (LLCP Data Link Connection). For details, refer to the LLCP protocol. Certainly, this embodiment of the present invention imposes no limitation on a specific transmission manner of the message.

In this embodiment of the present invention, after the first terminal 10 or the second terminal 20 receives a message sent by the other party, that is, after the NFC unit or the NFC function module receives a message sent by the other party by using the NFC antenna, the NFC unit or the NFC function module may parse a part of or all information in the message. For example, the message header in FIG. 15 or FIG. 16 is parsed, and it is assumed that a parsed role identifier is a charge payer. The terminal may be triggered to determine, as described in the foregoing embodiment, whether a transaction manner is bound to another authorized account or whether an account balance is sufficient, and to perform operations on the transaction manner according to the determining result, such as screening and sorting. Payment application identification information in FIG. 15 or FIG. 16 is parsed, and it is assumed that parsed payment application identification information is an Alipay client identifier. The terminal may be triggered to determine, as described in the foregoing embodiment, whether a transaction manner (that is, a payment client) supported by the terminal has an Alipay client, the terminal is triggered according to the determining result to perform an operation, for example, start or invoke a payment client matched by two parities, and the like. Certainly, partial information may not be parsed by the NFC unit or the NFC function module, for example, the account information carried in the message, a transaction amount, or other additional information related to a service (such as transaction description information: payment, charge receiving, borrowing, repayment, and entrusted payment).

A possible implementation of the present invention provides a near field communication NFC-based transaction method, and the method includes:

receiving, by a second terminal 20 by using an NFC connection, a negotiation message (for example, the negotiation message in FIG. 15 or FIG. 16) sent by a first terminal 10, where the negotiation message includes at least a first identifier list and a first account list, the first identifier list includes M pieces of identification information, so as to identify at least one transaction manner supported by the first terminal 10, and the first account list includes N pieces of account information corresponding to N pieces of identification information in the M pieces of identification information, where M≥1, and N≤M.

According to a possible implementation of the present invention, specific processing is determined by determining a value of the identification information amount M and a value of the account information amount N in the negotiation message, as shown below:

when M≥1 and N=1, the second terminal determines a first transaction manner according to a first preset rule (for example, the manner in FIG. 1, FIG. 2, FIG. 3, FIG. 4, FIG. 7, or FIG. 8), so as to complete a current transaction; or when M≥1 and N=0, the second terminal determines a first transaction manner according to a second preset rule (for example, the manner in FIG. 5 or FIG. 6), so as to complete a current transaction; or when M>1 and N>1, the second terminal determines a first transaction manner according to a third preset rule (for example, the manner in FIG. 9), so as to complete a current transaction.

According to a possible implementation of the present invention, determining whether the negotiation message includes the account information may include the following steps:

determining whether N is 0; and if N is 0, determining a first transaction manner according to a second preset rule (for example, the manner in FIG. 5 or FIG. 6), so as to complete a current transaction by sending a transaction request to a server corresponding to the first transaction manner by the first terminal 10 or the second terminal 20; or if N is not 0, performing processing in another manner, for example, first determining one piece of account information according to priority information or other information, then determining whether the first identifier list includes identification information corresponding to the account information; and if yes, determining that the identification information is the first transaction manner; or if no, determining another piece of account information, and continue the operation by analogy, until one piece of account information and identification information corresponding to the account information are found, so that the first terminal directly submits a request to the server corresponding to the first transaction manner. If the account information and the identification information corresponding to the account information are not found finally, one piece of identification information in identification information supported by two parties is determined as the first transaction manner, and the second terminal 20 may request corresponding account information from the first terminal 10, so that the second terminal 20 directly submits a request to a server; or the second terminal 20 notifies the first terminal 10 of an account of the second terminal 20, so that the first terminal submits a request to a server.

In this embodiment of the present invention, a more intelligent method is provided to resolve a face-to-face transfer problem of a user. This can determine an available payment client according to current states (for example, a registration/login state, an account balance status/a deposit card binding status) of all payment clients on a mobile phone, automatically match a payment client available for the two parties, and automatically invoke a to-be-used payment client. Therefore, the two parties do not need to negotiate a specific payment client, and not both parties need to actively start the client, and a user does not need to manually enter an account of the other party, thereby improving user experience.

The first terminal 10 and the second terminal 20 in this embodiment of the present invention may be terminals supporting an NFC function. The terminal may include a mobile phone, a wearable device (such as a smart watch or a smart band), a tablet computer, a personal computer (PC, Personal Computer), a PDA (Personal Digital Assistant, personal digital assistant), a POS (Point of Sales, point of sale), a vehicle-mounted computer, or the like.

The payment client or the server that is corresponding to the transaction manner in this embodiment of the present invention may be a financial server that is mainly configured to manage funds of a user, including but not limited to: a server provided by a third-party organization, such as Alipay, WeChat Pay, or PayPal, a server provided by Unionpay or a banking institution, a server provided by a terminal manufacturer such as a mobile phone, and any one or more combinations of these servers.

Figure 11:
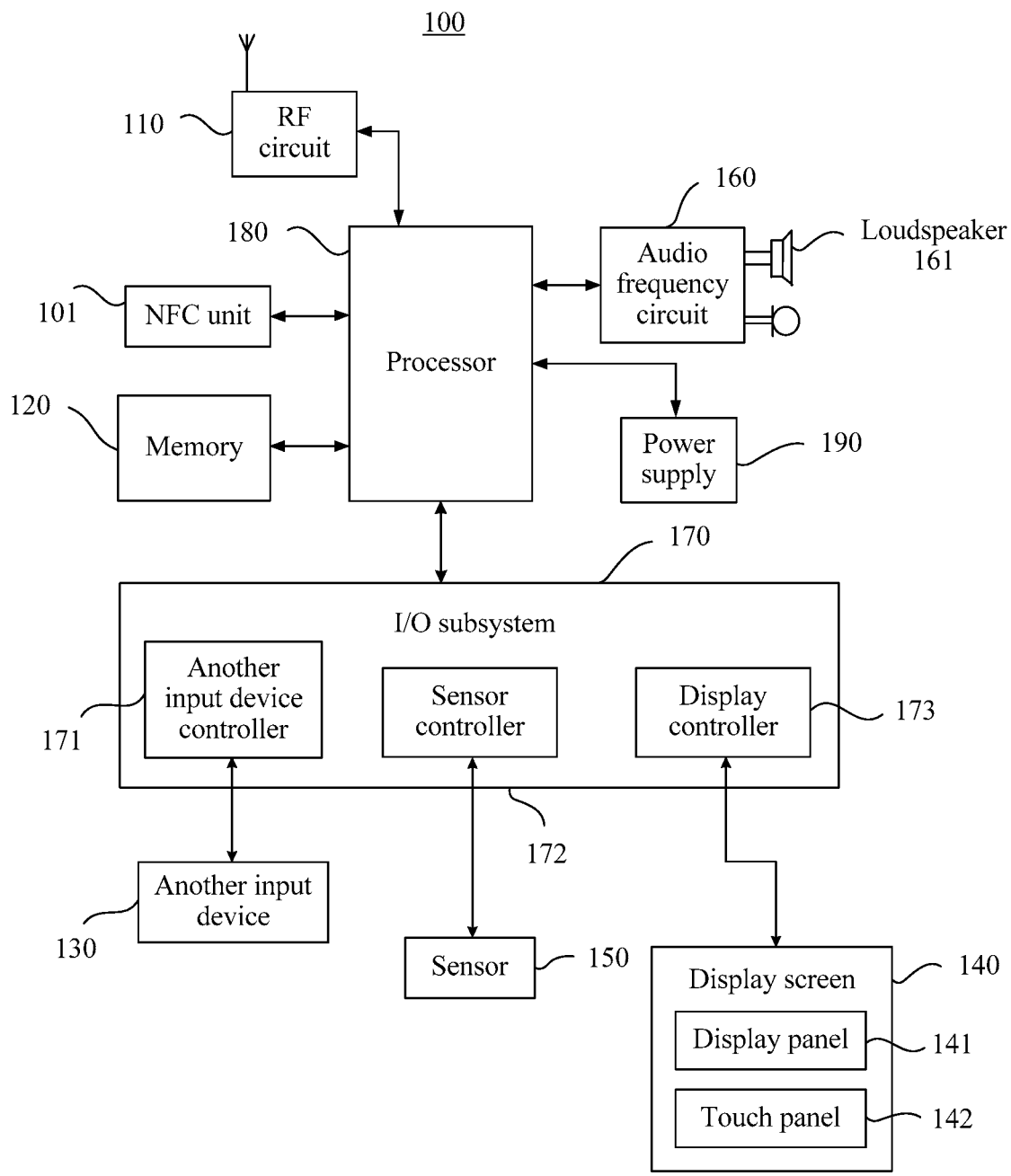
FIG. 11 shows a block diagram of a partial structure of a terminal according to a possible implementation of the present invention.

That a terminal is a mobile phone is used as an example. FIG. 11 shows a block diagram of a partial structure of a mobile phone 100 related to an embodiment of the present invention. Referring to FIG. 11, the mobile phone 100 includes components such as an RF (Radio Frequency, radio frequency) circuit 110, an NFC unit 101, a memory 120, another input device 130, a display screen 140, a sensor 150, an audio frequency circuit 160, an I/O subsystem 170, a processor 180, and a power supply 190. A person skilled in the art can understand that a structure of the mobile phone shown in FIG. 11 constitutes no limitation on the mobile phone. More or fewer components than those shown in the figure may be included, or some components may be combined, some components may be split, or arrangement of the components may be different. A person skilled in the art can understand that the display screen 140 belongs to a user interface (UI, User Interface), and the mobile phone 100 may include more or fewer user interfaces than those shown in the figure.

The following describes components of the mobile phone 100 in detail with reference to FIG. 11:

The RF circuit 110 may be configured to: receive and send a signal in an information receiving or sending process or a call process; in particular, after receiving downlink information of a base station, send the downlink information to the processor 180 for processing; and send designed uplink data to the base station. Generally, the RF circuit includes but is not limited to an antenna, at least one amplifier, a transceiver, a coupler, an LNA (Low Noise Amplifier, low noise amplifier), a duplexer, and the like. In addition, the RF circuit 110 may communicate with a network and another device by means of wireless communication. Any communications standard or protocol may be used for the wireless communication, including but not limited to: GSM (Global System of Mobile communication, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short Messaging Service, short message service), and the like.

The NFC unit 101 is configured to communicate with another NFC device.

The memory 120 may be configured to store a software program and a software module. By running the software program and the software module that are stored in the memory 120, the processor 180 executes various function applications of the mobile phone 100 and performs data processing. The memory 120 may mainly include a program storage area and a data storage area. The program storage area may store an operating system, an application program required by at least one function (such as a sound playback function or an image playback function), and the like; and the data storage area may store data (such as audio data or a phonebook) created according to use of the mobile phone 100, and the like. In addition, the memory 120 may include a high-speed random access memory, or may include a nonvolatile memory, such as at least one magnetic disk storage device, a flash memory device, or another volatile solid-state storage device.

The first terminal 10 and/or the second terminal 20 may store, in the memory 120, their respective lists of transaction manners supported, and/or their respective lists of accounts corresponding to transaction manners, and/or transaction information that is entered by the user and that is received by a displayed transaction interface before transaction manner negotiation.

The another input unit 130 may be configured to: receive input digital or character information; and generate key signal input related to user setting and function control of the mobile phone 100. Specifically, the another input device 130 may include but is not limited to one or more of a physical keyboard, a function button (such as a volume control button or a power on/off button), a trackball, a mouse, a joystick, or an optical mouse (the optical mouse is a touch-sensitive surface that does not display visual output, or an extension of a touch-sensitive surface formed by a touchscreen). The another input device 130 and the I/O subsystem 170 are connected to another input device controller 171, and perform signal exchange with the processor 180 under the control of the another input device controller 171.

The display screen 140 may be configured to display information entered by the user or information provided to the user, and various menus of the mobile phone 100, or may receive user input. Specifically, the display screen 140 may include a display panel 141 and a touch panel 142. The display panel 141 may be configured in a form of an LCD (Liquid Crystal Display, liquid crystal display) or an OLED (Organic Light-Emitting Diode, organic light-emitting diode). The touch panel 142 is also referred to as a touchscreen, a touch-sensitive screen, or the like, may collect a contact or contactless operation performed by the user on or near the touch panel 142 (for example, an operation performed by the user on or near the touch panel 142 by using any proper object or accessory such as a finger or a stylus, or a motion sensing operation. The operation includes an operation type such as a single-point control operation or a multipoint control operation), and may drive a corresponding connection apparatus according to a preset program. Optionally, the touch panel 142 may include two parts: a touch detection apparatus and a touch controller. The touch detection apparatus detects a touch location and a touch gesture of the user, detects a signal brought by a touch operation, and sends the signal to the touch controller. The touch controller receives touch information from the touch detection apparatus, converts the touch information into information that can be processed by the processor, and then sends the information to the processor 180, and can receive and execute a command sent by the processor 180. In addition, the touch panel 142 may be implemented in multiple types, such as a resistive type, a capacitive type, an infrared type, or a surface acoustic wave type, or the touch panel 142 may be implemented by using any future technology. Further, the touch panel 142 may cover the display panel 141. The user may perform, according to content displayed on the display panel 141 (the displayed content includes but is not limited to a soft keyboard, a virtual mouse, a virtual key, and an icon), an operation on or near the touch panel 142 covered by the display panel 141. After detecting a touch operation performed on or near the touch panel, the touch panel 142 transfers the touch operation to the processor 180 by using the I/O subsystem 170, so as to determine a touch event type to determine user input. Then, the processor 180 provides corresponding visual output on the display panel 141 according to the touch event type and the user input by using the I/O subsystem 170. Although the touch panel 142 and the display panel 141 in FIG. 11 are used as two independent parts to implement input and input functions of the mobile phone 100, in some embodiments, the touch panel 142 and the display panel 141 may be integrated to implement the input and output functions of the mobile phone 100.

The mobile phone 100 may further include at least one sensor 150, such as an optical sensor, a motion sensor, or another sensor. Specifically, the optical sensor may include an ambient light sensor and a proximity sensor. The ambient light sensor may adjust luminance of the display panel 141 according to brightness or dimness of environment light, and the proximity sensor may turn off the display panel 141 and/or backlight when the mobile phone 100 approaches an ear. As a type of the motion sensor, an accelerometer sensor may detect an acceleration value in each direction (generally, three axes), detect a value and a direction of gravity when the accelerometer sensor is still, and may be applied to an application that identifies a mobile phone posture (for example, switching between landscape and portrait screens, related games, and magnetometer posture calibration), a function related to vibration recognition (such as a pedometer or a knock), and the like. Other sensors such as a gyroscope, a barometer, a hygrometer, a thermometer, and an infrared sensor may also be disposed on the mobile phone 100, and details are not described herein.

The audio frequency circuit 160, a loudspeaker 161, and a microphone 162 may provide an audio interface between the user and the mobile phone 100. The audio frequency circuit 160 may transmit, to the loudspeaker 161, the received signal obtained by means of audio data conversion, and the loudspeaker 161 converts the signal into a sound signal for output. On the other hand, the microphone 162 converts a collected sound signal into a signal, and the audio frequency circuit 160 receives the sound signal, converts the sound signal into audio data, and then outputs the audio data to the RF circuit 108, so as to send the audio data to, for example, another mobile phone, or output the audio data to the memory 120 for further processing.

The I/O subsystem 170 is configured to control an external input/output device, and may include another input device controller 171, a sensor controller 172, and a display controller 173. Optionally, one or more other input control device controllers 171 receive a signal from the another input device 130 and/or send a signal to the another input device 130. The another input device 130 may include a physical button (a press button, a rocker button, or the like), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the another input control device controller 171 may be connected to any one or more of the foregoing devices. The display controller 173 in the I/O subsystem 170 receives a signal from the display screen 140 and/or sends a signal to the display screen 140. After the display screen 140 detects the user input, the display controller 173 converts the detected user input into interaction with a user interface object displayed on the display screen 140, that is, implements human-machine interaction. The sensor controller 172 may receive a signal from one or more sensors 150 and/or send a signal to one or more sensors 150.

The processor 180 is a control center of the mobile phone 100, and uses various interfaces and lines to connect all parts of the entire mobile phone. By running or executing a software program and/or a module stored in the memory 120 and calling data stored in the memory 120, the processor executes various functions of the mobile phone 100 and processes data, so as to perform overall monitoring on the mobile phone. Optionally, the processor 180 may include one or more processing units. Preferably, an application processor and a modem processor may be integrated into the processor 180. The application processor mainly handles an operating system, a user interface, an application program, and the like. The modem processor mainly handles wireless communication. It can be understood that, alternatively, the foregoing modem processor may not be integrated into the processor 180.

The mobile phone 100 further includes the power supply 190 (such as a battery) that supplies power to each component. Preferably, the power supply may be logically connected to the processor 180 by using a power supply management system. In this way, functions such as management of charging, discharging, and power consumption are implemented by using the power supply management system.

Although not shown in the figure, the mobile phone 100 may further include a camera, a Bluetooth module, and the like. Details are not described herein.

Figure 12:
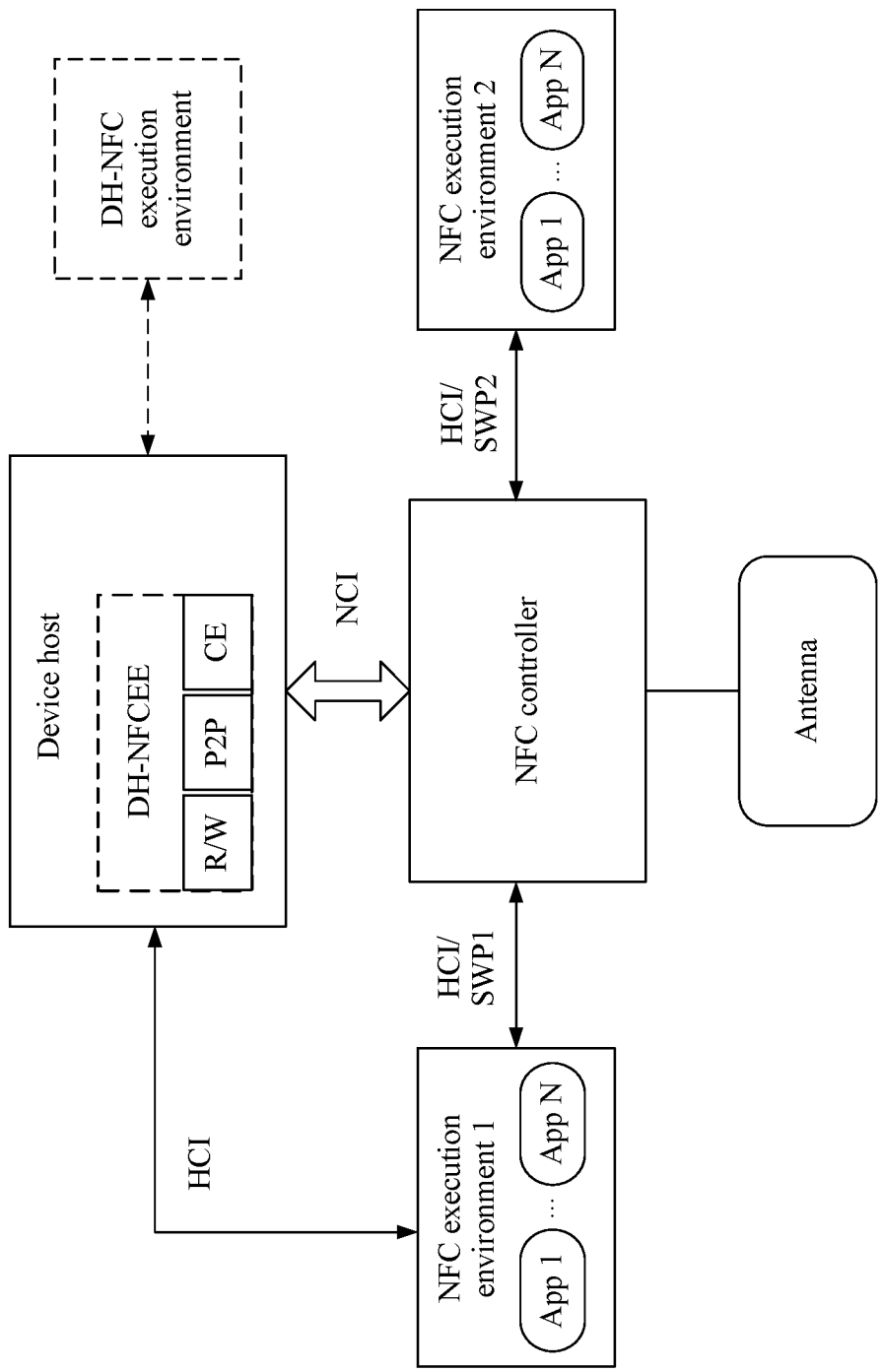
FIG. 12 shows a block diagram of a partial structure of a device with an NFC function (NFC device for short) according to a possible implementation of the present invention.

FIG. 12 shows a block diagram of a partial structure of a device with an NFC function (NFC device for short) according to a possible implementation of the present invention. As shown in FIG. 12, the device with an NFC function (the NFC device for short in the following) is mainly formed by the following three function entities: a device host (device host, DH for short), an NFC controller (NFC controller, NFCC for short), and an NFC execution environment (NFC Execution Environment, NFCEE for short). The DH is responsible for NFCC management, such as initialization, configuration, and power supply management. The NFCC is responsible for physical transmission of data by using a radio frequency interface and an antenna. The NFCEE may provide an NFC application program with a secure execution environment, may securely store and run an application to ensure that data related to the application is not tampered and illegally accessed, such as a key or a certificate, may further store a rule for accessing confidential data, and the like. An NFC control interface (NFC control interface, NCI for short) defines a logical interface used for communication between the DH and the NFCC. The DH may communicate with the NFCC by using an NCI protocol. In addition, the NFCC may communicate with the NFCEE by using a communication protocol, such as a host controller interface (host controller interface, HCI for short) or the Single Wire Protocol (single wire protocol, SWP for short).

In an actual device, the DH is usually a CPU of the device.

Figure 13:
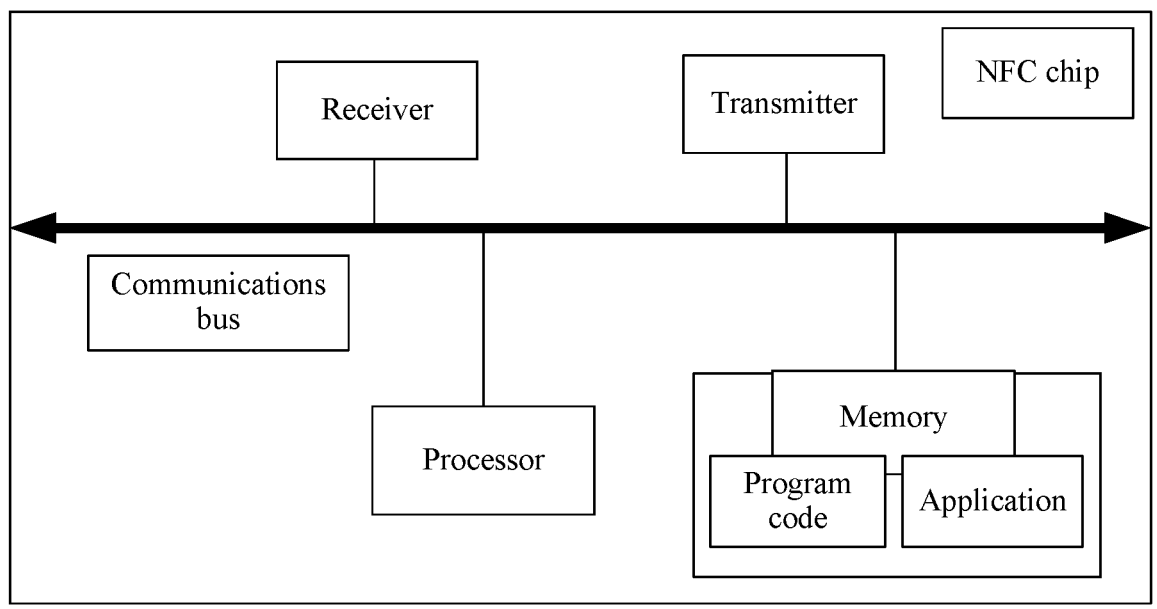
FIG. 13 shows a block diagram of a partial structure of an NFC controller (NFC controller, NFCC for short) according to a possible implementation of the present invention.

FIG. 13 shows a block diagram of a partial structure of an NFC controller (NFC controller, NFCC for short) according to a possible implementation of the present invention. As shown in FIG. 13, the NFCC is generally a dedicated NFC chip, and the NFC chip integrates one processing unit, an NFC radio frequency transmitter, and an NFC radio frequency receiver. In addition, a memory is usually integrated into the NFC chip, so as to store program code to be executed by the foregoing processing unit. The NFC radio frequency transmitter and the NFC radio frequency receiver in the NFCC and an NFC antenna provide an NFC device with an NFC radio frequency interface.

The NFCEE may be implemented on an actual device in multiple manners. For example, a function of the NFCEE may be implemented by using specific hardware, such as a specific hardware module. The hardware module may be solidified on a circuit board of the NFC device. For example, an embedded universal integrated circuit card (embeded Universal Integrated Circuit Card, eUICC) may be integrated with a subscriber identity module (Subscriber Identity Module, SIM), a universal integrated circuit card (Universal Integrated Circuit Card, UICC), and a secure digital (Secure Digital, SD) card. Another manner of implementing the NFCEE is to implement the function of the NFCEE on the NFCC, that is, NDEF-NFCC. In addition, the NFCEE may also be implemented by using software, for example, a host-based card emulation (host-based card emulation, HCE) environment running on the DH.

The NFCEE includes a device host—near field communication execution environment (Device Host—NFCEE, DH-NFCEE for short) and an NFCEE based on multiple different physical carriers (for example, the foregoing UICC or SD). Multiple different NFCEEs may be deployed on a same NFC terminal, and different contactless applications may be configured in the different NFCEEs.

All the DH, the NFCC, and the NFCEE used in this embodiment of the present invention are terms used in an NCI specification formulated by the NFC Forum. The DH may further correspond to a terminal host (English: Terminal Host) in an HCI specification formulated by the European Telecommunications Standards Institute (English full name: European Telecommunication Standards Institute, ETSI for short). In addition, if a managing entity (English full name: Managing Entity, ME for short) in a specification formulated by the Global Platform (English full name: Global Platform, GP for short) is implemented on the terminal host, the DH may also be referred to as a managing host (English full name: Managing Host, MH for short). The NFCC may further correspond to a contactless front-end (English full name: Contactless Front-end, CLF for short) in the HCI specification. In this case, a host controller (English: Host Controller) in the HCI specification is implemented on the NFCC. The NFCEE may further correspond to a host in the HCI specification, such as the UICC, an eSE, or the SD card, a secure element (English full name: Secure Element, SE for short) in the specification formulated by the GP, or a card emulation environment (English full name: Card Emulation Environment, CEE for short).

The NFC application in this embodiment of the present invention is usually an application that is installed in the NFCEE and that can perform transaction with a card reader by using an NFC interface provided by the NFCC. For example, both a bus card application installed in the universal integrated circuit card (English: Universal Integrated Circuit Card, UICC for short) of the mobile phone and an electronic cash card application are the NFC application. The NFC application has different names in specifications formulated by different standardization organizations. For example, the NFC application is referred to as a contactless application (English: Contactless Application, CL App for short) in the specification formulated by the GP, or referred to as an NFC service (NFC Service) in a related specification formulated by the NFC Forum.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and a disc (disc) used in the present invention include a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A near field communication (NFC)-based transaction method, wherein the method comprises:
   receiving, by a first terminal using an NFC connection, a transaction message sent by a second terminal, wherein:
      the transaction message comprises one or more records; and
      each record in the one or more records comprises information indicating a money transfer method supported by the second terminal;
   identifying, by the first terminal, one or more matching money transfer methods based on the one or more records in the transaction message received from the second terminal;
   selecting, by the first terminal, a money transfer method from the one or more matching transfer methods for use in a money transfer transaction with the second terminal;
   sending, by the first terminal, to the second terminal, a money transfer response message containing the selected money transfer method; and
   using, by the first terminal, the money transfer method for the money transfer transaction with the second terminal.

2. The method according to claim 1, wherein before using, by the first terminal, the money transfer method, the method further comprises:
   confirming, by the first terminal, the money transfer method for the money transfer transaction, wherein confirming the money transfer method comprises receiving confirmation from a user of the first terminal for use of the money transfer method.

3. The method according to claim 1, wherein selecting, by the first terminal, the money transfer method comprises:
   displaying, by the first terminal, the the one or more matching transfer methods; and
   in response to an operation of a user, selecting the money transfer method by first terminal.

4. The method according to claim 1, wherein before identifying, by the first terminal, the one or more matching money transfer methods based on the one or more records in the transaction message comprises:
   sorting, by the first terminal, the one or more records in the transaction message.

5. The method according to claim 4, wherein sorting, by the first terminal, the one or more records in the transaction message comprises:
   arranging, by the first terminal, the one or more records according to a priority sequence; and
   removing one or more currently unavailable matching money transfer methods from the one or more records.

6. The method according to claim 5, wherein using, by the first terminal, the money transfer method for the money transfer transaction with the second terminal comprises:
   communicating, by the second terminal, with a server corresponding to the money transfer method to perform the money transfer transaction between the first terminal with the second terminal.

7. The method according to claim 4, wherein sorting, by the first terminal, the one or more records in the transaction message comprises:
   sorting according to an account balance associated with each of the one or more records.

8. The method according to claim 7, wherein using, by the first terminal, the money transfer method for the money transfer transaction with the second terminal comprises:
   communicating, by the first terminal, with a server corresponding to the money transfer method to perform the money transfer transaction between the first terminal with the second terminal.

9. The method according to claim 1, wherein:
   the each record in the one or more records comprises an identifier of a money transfer method supported by the second terminal;
   identifying, by the first terminal, the one or more matching money transfer methods based on the one or more records in the transaction message received from the second terminal further comprises:
      identifying, by the first terminal, one record from the one or more records according to whether each identifier of the one or more records matches a money transfer method supported by the first terminal.

10. The method according to claim 1, wherein:
    the first terminal is payer or the second terminal is payer.

11. The method according to claim 1, wherein the second terminal is responsible for submitting a money transfer transaction request corresponding to the money transfer transaction to a payment server and the method further comprises:
- generating, by the second terminal, the money transfer transaction request; and
- submitting, by the second terminal, the money transfer transaction request to the payment server.

12. The method according to claim 1, wherein selecting, by the first terminal, the money transfer method comprises: when the second terminal is a payer, selecting the money transfer method based on an order of the one or more records in the transaction message; and when the first terminal is a payer, selecting the money transfer method based on a preset preference of the first terminal.

13. A terminal, comprising:
- a memory storing instructions; and
- at least one processor coupled to the memory to execute the instructions to:
  - receive, by an NFC connection, a transaction message, wherein:
    - the transaction message comprises one or more records; and
    - each record in the one or more records comprises information indicating a money transfer method supported by a second terminal;
  - identify one or more matching money transfer methods based on the one or more records in the transaction message received from the second terminal;
  - select a money transfer method from the one or more matching transfer methods for use in a money transfer transaction with the second terminal, wherein selecting the money transfer method comprises:
    - when the second terminal is a payer, selecting the money transfer method based on an order of the one or more records in the transaction message; and
    - when the first terminal is a payer, selecting the money transfer method based on a preset preference of the first terminal;
  - send a money transfer response message containing the money transfer method; and
  - use the money transfer method for the money transfer transaction with the second terminal.

14. The terminal according to claim 13, wherein before using the money transfer method, the instructions further comprise:
- confirm the money transfer method for the money transfer transaction, wherein confirming the money transfer method comprises receiving confirmation from a user of the first terminal for use of the money transfer method.

15. The terminal according to claim 13, wherein the instructions of the selecting the money transfer method further comprise:
- displaying the one or more matching transfer methods; and
- in response to an operation of a user, selecting the money transfer method first record by the first terminal.

16. The terminal according to claim 13, wherein before identifying the the one or more matching money transfer methods based on the one or more records in the transaction message, the instructions further comprise:
- sorting the one or more records in the transaction message.

17. The terminal according to claim 16, wherein the instructions of sorting the one or more records in the transaction message further comprise:
- arrange the one or more records according to a priority sequence; and
- remove one or more currently unavailable matching money transfer methods from the one or more records.

18. The terminal according to claim 16, wherein the instructions for sorting the one or more records in the transaction message further comprise:
- sort according to an account balance associated with each of the one or more records.

19. The terminal according to claim 18, wherein the instructions of using the money transfer method for transaction with the second terminal further comprise:
- communicate with a server corresponding to the money transfer method to perform the money transfer transaction with the second terminal.

20. The terminal according to claim 13, wherein:
- the each record in the one or more records comprises an identifier of a money transfer method supported by the second terminal;
- the instructions of identifying the one or more matching money transfer methods based on the one or more records in the transaction message received from the second terminal further comprise:
  - identify the one or more matching money transfer methods from the one or more records according to whether each identifier of the one or more records matches a money transfer method supported by the first terminal.

21. The terminal according to claim 13, wherein:
the second terminal is payer.

* * * * *